(12) United States Patent
Nishida et al.

(10) Patent No.: US 8,449,061 B2
(45) Date of Patent: May 28, 2013

(54) SPEED CALCULATION DEVICE, IMAGE FORMING DEVICE, AND STORAGE MEDIUM

(75) Inventors: Toru Nishida, Kanagawa (JP); Hiroaki Satoh, Kanagawa (JP); Susumu Kibayashi, Kanagawa (JP); Takeshi Zengo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 562 days.

(21) Appl. No.: 12/465,100

(22) Filed: May 13, 2009

(65) Prior Publication Data

US 2010/0149234 A1     Jun. 17, 2010

(30) Foreign Application Priority Data

Dec. 16, 2008    (JP) .................................. 2008-319573

(51) Int. Cl.
    *B41J 29/38*         (2006.01)
(52) U.S. Cl.
    USPC .............................................................. 347/14
(58) Field of Classification Search
    USPC .............................................................. 347/14
    See application file for complete search history.

(56) References Cited

U.S. PATENT DOCUMENTS

| | | | | |
|---|---|---|---|---|
| 4,367,943 A | * | 1/1983 | Nakamura | 358/300 |
| 4,992,730 A | * | 2/1991 | Hagiya | 324/160 |
| 5,019,773 A | * | 5/1991 | Sugiura et al. | 324/166 |
| 5,444,525 A | * | 8/1995 | Takahashi et al. | 399/76 |
| 5,889,534 A | * | 3/1999 | Johnson et al. | 347/19 |
| 6,170,933 B1 | * | 1/2001 | Nitta et al. | 347/42 |
| 2003/0057364 A1 | * | 3/2003 | Hashimoto | 250/231.13 |
| 2007/0103496 A1 | * | 5/2007 | Otani | 347/11 |

FOREIGN PATENT DOCUMENTS

| | | | |
|---|---|---|---|
| JP | 1-286791 | | 11/1989 |
| JP | 3-068869 | | 3/1991 |
| JP | 2003-262649 | * | 9/2003 |
| JP | 2004-195785 | | 7/2004 |
| JP | 2007-098854 | | 4/2007 |
| JP | 2007-145008 | | 6/2007 |
| JP | 2007-301768 | | 11/2007 |
| JP | 2008-213223 | | 9/2008 |

OTHER PUBLICATIONS

Office Action issued Dec. 21, 2011 in U.S. Appl. No. 12/635,850.
Office Action issued Mar. 12, 2013 in Japanese patent application No. 2009-204666.
English Language Abstract of JP 3-68869.
English Language translation of JP 2007-098854.
English Language translation of JP 2008-213223.
English Language Abstract of JP 1-286791.

* cited by examiner

*Primary Examiner* — Charlie Peng
(74) *Attorney, Agent, or Firm* — Fildes & Outland, P.C.

(57) ABSTRACT

A speed calculation device is provided. The generation component generates a plurality of pulse signals with different phases in accordance with rotation of a rotating body. The detection component detects rises and falls of respective pulses of the plurality of pulse signals generated by the generation component. The duration calculation component, each time a rise or fall is detected by the detection component, calculates a total duration of a pre-specified number of durations representing detection intervals of rises or falls detected by the detection component prior to the current rise or fall detected by the detection component. The speed calculation component calculates a speed relating to rotation of the rotating body on the basis of the total duration and a rotation angle of the rotating body that corresponds to one pulse of the pulse signals.

18 Claims, 19 Drawing Sheets

SPEED CALCULATION DEVICE, IMAGE FORMING DEVICE, AND STORAGE MEDIUM

CROSS-REFERENCE TO RELATED APPLICATIONS

This application is based on and claims priority under 35 USC 119 from Japanese Patent Application No. 2008-319573 filed Dec. 16, 2008.

BACKGROUND

1. Technical Field of the Invention

The present invention relates to a speed calculation device, an image forming device, and a storage medium.

2. Related Art

Heretofore, an image recording device has been known that generates a print clock on the basis of a pre-memorized print clock correction amount and print clock modification amounts that are calculated from amounts of variation of an angular speed, and a timing pulse generation device has been known that determines a droplet ejection period of a droplet ejection component on the basis of a pulse signal with a period which is a division of a predicted period, for which a period of the pulse signal generated from the image recording device is predicted.

SUMMARY OF THE INVENTION

According to an aspect of the present invention there is provided a speed calculation device including: a generation component that generates a plurality of pulse signals with different phases in accordance with rotation of a rotating body; a detection component that detects rises and falls of respective pulses of the plurality of pulse signals generated by the generation component; a duration calculation component that, each time a rise or fall is detected by the detection component, calculates a total duration of a pre-specified number of durations representing detection intervals of rises or falls detected by the detection component prior to the current rise or fall detected by the detection component; and a speed calculation component that calculates a speed relating to rotation of the rotating body on the basis of the total duration and a rotation angle of the rotating body that corresponds to one pulse of the pulse signals.

BRIEF DESCRIPTION OF THE DRAWINGS

Exemplary embodiments of the present invention will be described in detail based on the following figures, wherein.

DETAILED DESCRIPTION

Herebelow, the best embodiments for implementing the present invention will be described in detail with reference to the drawings.

—First Exemplary Embodiment—

Figure 1:
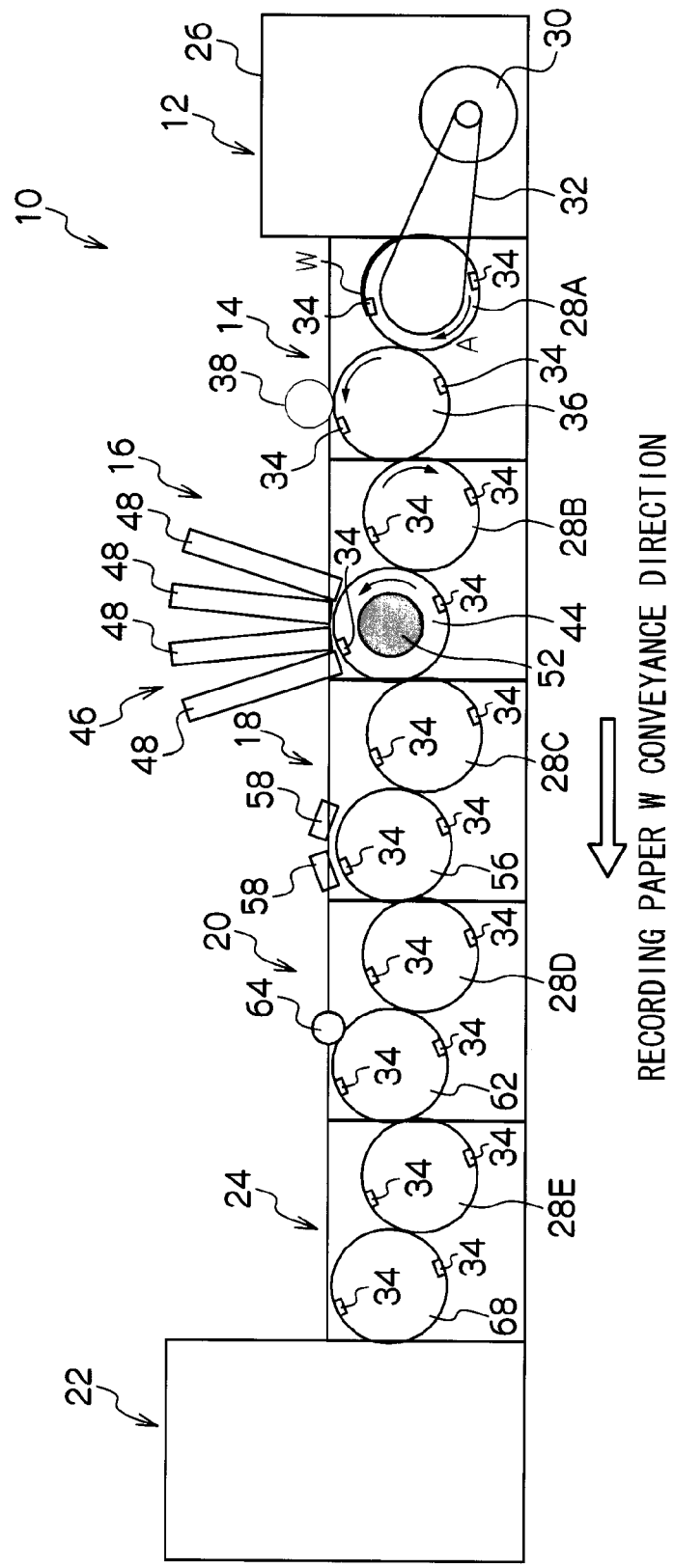
FIG. 1 is a diagram illustrating structure of an image forming device relating to a first exemplary embodiment of the present invention.

Firstly, a first exemplary embodiment will be described. For the present exemplary embodiment, a case is described in which the present invention is applied to an inkjet-system image forming device. FIG. 1 is a diagram illustrating structure of an image forming device 10 relating to the present exemplary embodiment.

As shown in FIG. 1, a paper supply conveyance section 12 is provided at the image forming device 10. The paper supply conveyance section 12 supplies and conveys recording paper W, which is a recording medium. At a downstream side of the paper supply conveyance section 12 in a conveyance direction of the recording paper W, a processing fluid application section 14, an image formation section 16, an ink drying section 18, an image fixing section 20 and an ejection conveyance section 24 are provided along the conveyance direction of the recording paper W. The processing fluid application section 14 applies a processing fluid to a recording face (front face) of the recording paper W. The image formation section 16 forms an image on the recording face of the recording paper W. The ink drying section 18 dries the image that has been formed at the recording face. The image fixing section 20 fixes the dried image to the recording paper W. The ejection conveyance section 24 conveys the recording paper W to which the image has been fixed to an ejection section 22.

The paper supply conveyance section 12 is provided with an accommodation section 26 that accommodates the recording paper W. A motor 30 is provided at the accommodation section 26. A paper supply apparatus is also provided at the accommodation section 26. The recording paper W is fed out from the accommodation section 26 toward the processing fluid application section 14 by the paper supply apparatus.

The processing fluid application section 14 is provided with an intermediate conveyance drum 28A and a processing fluid application drum 36. The intermediate conveyance drum 28A is rotatably disposed between the accommodation section 26 and the processing fluid application drum 36. A belt 32 spans between a rotation axle of the intermediate conveyance drum 28A and a rotation axle of the motor 30. Accordingly, rotary driving force of the motor 30 is transmitted to the intermediate conveyance drum 28A via the belt 32, and the intermediate conveyance drum 28A rotates in the direction of circular arc arrow A.

A retention member 34 is provided at the intermediate conveyance drum 28A. The retention member 34 nips a distal end portion of the recording paper W and retains the recording paper W. The recording paper W that is fed out from the accommodation section 26 to the processing fluid application section 14 is retained at a peripheral face of the intermediate conveyance drum 28A by the retention member 34, and is conveyed to the processing fluid application drum 36 by rotation of the intermediate conveyance drum 28A.

Similarly to the intermediate conveyance drum 28A, retention members 34 are provided at intermediate conveyance drums 28B, 28C, 28D and 28E, the processing fluid application drum 36, an image forming drum 44, an ink drying drum 56, an image fixing drum 62 and an ejection conveyance drum 68, which are described below. The recording paper W is passed along from upstream side drums to downstream side drums by these retention members 34.

The processing fluid application drum 36 is linked with the intermediate conveyance drum 28A by gears, and receives rotary force and rotates.

The recording paper W that has been conveyed by the intermediate conveyance drum 28A is taken up onto the processing fluid application drum 36 by the retention member 34 of the processing fluid application drum 36, and is conveyed in a state of being retained at a peripheral face of the processing fluid application drum 36.

At an upper portion of the processing fluid application drum 36, a processing fluid application roller 38 is disposed in a state of touching against the peripheral face of the processing fluid application drum 36. Processing fluid is applied to the recording face of the recording paper W on the peripheral face of the processing fluid application drum 36 by the processing fluid application roller 38. This processing fluid will react with the ink and coagulate a colorant (pigment), and promote separation of the colorant from a solvent.

The recording paper W to which the processing fluid has been applied by the processing fluid application section 14 is conveyed to the image formation section 16 by rotation of the processing fluid application drum 36.

The image formation section 16 is provided with the intermediate conveyance drum 28B and the image forming drum 44. The intermediate conveyance drum 28B is linked with the intermediate conveyance drum 28A by gears, and receives rotary force and rotates.

The recording paper W that has been conveyed by the processing fluid application drum 36 is taken up onto the intermediate conveyance drum 28B by the retention member 34 of the intermediate conveyance drum 28B of the image formation section 16, and is conveyed in a state of being retained at a peripheral face of the intermediate conveyance drum 28B.

The image forming drum 44, which is a rotating body, is linked with the intermediate conveyance drum 28A by gears, and receives rotary force and rotates.

The recording paper W that has been conveyed by the intermediate conveyance drum 28B is taken up onto the image forming drum 44 by the retention member 34 of the image forming drum 44, and is conveyed in a state of being retained at a peripheral face of the image forming drum 44.

Above the image forming drum 44, a head unit 46 is disposed close to the peripheral face of the image forming drum 44. The head unit 46 is provided with four inkjet recording heads 48, corresponding to each of the four colors yellow (Y), magenta (M), cyan (C) and black (K). These inkjet recording heads 48 are arranged along the peripheral direction of the image forming drum 44, and form an image by ejecting ink droplets from nozzles 48a, which will be described later, synchronously with clock signals, which will be described later, such that the ink droplets are superposed with a film of the processing fluid that has been formed on the recording face of the recording paper W by the processing fluid application section 14.

The image forming drum 44 is provided with a rotary encoder 52. The rotary encoder 52 relating to the present exemplary embodiment, in accordance with rotation of the image forming drum 44, generates and outputs plural pulse signals with respectively different phases. One pulse of the pulse signals corresponds to a pre-specified rotation angle $\theta_0$ (for example, 1.257 milliradians). In the present exemplary embodiment, the rotary encoder 52 generates two pulse signals, of phase A and phase B.

The recording paper W on which the image has been formed at the recording face by the image formation section 16 is conveyed to the ink drying section 18 by rotation of the image forming drum 44.

The ink drying section 18 is provided with the intermediate conveyance drum 28C and the ink drying drum 56. The intermediate conveyance drum 28C is linked with the intermediate conveyance drum 28A by gears, and receives rotary force and rotates.

The recording paper W that has been conveyed by the image forming drum 44 is taken up onto the intermediate conveyance drum 28C by the retention member 34 of the intermediate conveyance drum 28C, and is conveyed in a state of being retained at a peripheral face of the intermediate conveyance drum 28C.

The ink drying drum 56 is linked with the intermediate conveyance drum 28A by gears, and receives rotary force and rotates.

The recording paper W that has been conveyed by the intermediate conveyance drum 28C is taken up onto the ink drying drum 56 by the retention member 34 of the ink drying drum 56, and is conveyed in a state of being retained at a peripheral face of the ink drying drum 56.

Above the ink drying drum 56, a hot air heater 58 is disposed close to the peripheral face of the ink drying drum 56. Excess solvent in the image that has been formed on the recording paper W is removed by hot air from the hot air heater 58. The recording paper W at which the image on the recording face has been dried by the ink drying section 18 is conveyed to the image fixing section 20 by rotation of the ink drying drum 56.

The image fixing section 20 is provided with the intermediate conveyance drum 28D and the image fixing drum 62.

The intermediate conveyance drum 28D is linked with the intermediate conveyance drum 28A by gears, and receives rotary force and rotates.

The recording paper W that has been conveyed by the ink drying drum 56 is taken up onto the intermediate conveyance drum 28D by the retention member 34 of the intermediate conveyance drum 28D, and is conveyed in a state of being retained at a peripheral face of the intermediate conveyance drum 28D.

The image fixing drum 62 is linked with the intermediate conveyance drum 28A by gears, and receives rotary force and rotates.

The recording paper W that has been conveyed by the intermediate conveyance drum 28D is taken up onto the image fixing drum 62 by the retention member 34 of the image fixing drum 62, and is conveyed in a state of being retained at a peripheral face of the image fixing drum 62.

At an upper portion of the image fixing drum 62, a fixing roller 64, which has a heater thereinside, is disposed in a state of abutting against a peripheral face of the image fixing drum 62. The recording paper W retained at the peripheral face of the image fixing drum 62 is heated by the heater in a state in which the recording paper W is pressing against the fixing roller 64, and thus colorant in the image formed at the recording face of the recording paper W is fused to the recording paper W, and the image is fixed to the recording paper W. The recording paper W to which the image has been fixed by the image fixing section 20 is conveyed to the ejection conveyance section 24 by rotation of the image fixing drum 62.

The ejection conveyance section 24 is provided with the intermediate conveyance drum 28E and the ejection conveyance drum 68. The intermediate conveyance drum 28E is linked with the intermediate conveyance drum 28A by gears, and receives rotary force and rotates.

The recording paper W that has been conveyed by the image fixing drum 62 is taken up onto the intermediate conveyance drum 28E by the retention member 34 of the intermediate conveyance drum 28E, and is conveyed in a state of being retained at a peripheral face of the intermediate conveyance drum 28E.

The ejection conveyance drum 68 is linked with the intermediate conveyance drum 28A by gears, and receives rotary force and rotates.

The recording paper W that has been conveyed by the intermediate conveyance drum 28E is taken up onto the ejection conveyance drum 68 by the retention member 34 of the ejection conveyance drum 68, and is conveyed toward the ejection section 22 in a state of being retained at a peripheral face of the ejection conveyance drum 68.

Figure 2:
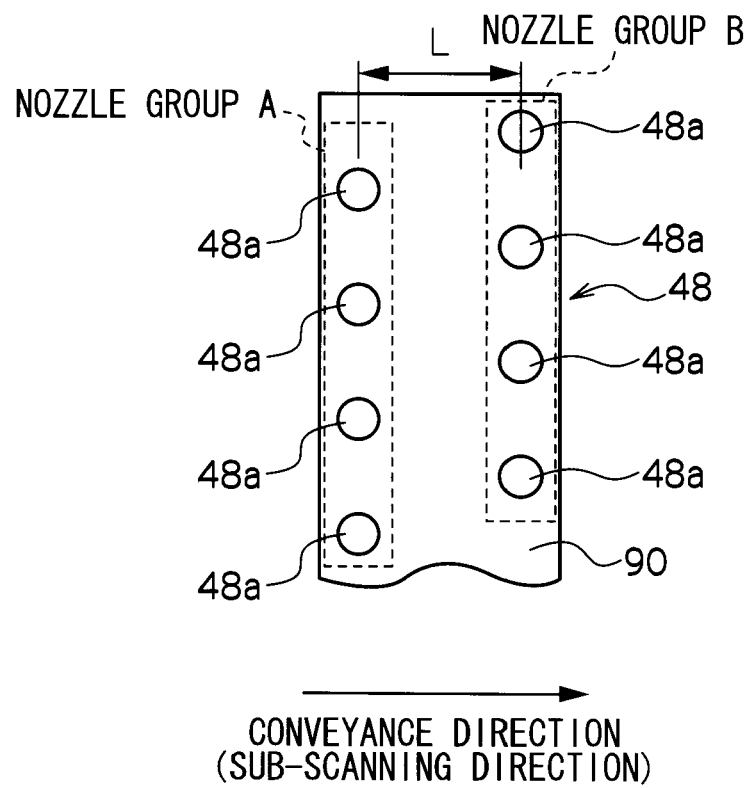
FIG. 2 is a diagram illustrating structure of an inkjet ejection aperture face side of an inkjet recording head relating to the first exemplary embodiment of the present invention.

FIG. 2 is a diagram illustrating structure of an inkjet ejection aperture face side of the inkjet recording head 48 relating to the present exemplary embodiment.

As shown in FIG. 2, a plurality of the nozzles 48a, which respectively eject ink droplets, are formed in a face 90 of the inkjet recording head 48 that opposes the peripheral face of the image forming drum 44. The inkjet recording head 48 has a structure in which the plural nozzles 48a are arranged in a two-dimensional pattern (a staggered matrix form in the present exemplary embodiment) without overlapping in the direction of conveyance of the recording paper W by the image forming drum 44 (i.e., a sub-scanning direction). Thus, an increase in density of an effective nozzle spacing (projected nozzle pitch) as projected so as to lie along a head length direction (a direction orthogonal to the direction of conveyance of the recording paper W by the image forming drum 44 (which is below referred to simply as the conveyance direction)) is achieved.

Here, in the inkjet recording head 48 relating to the present exemplary embodiment, the plural nozzles 48a are arranged in two rows with respect to the sub-scanning direction and the two rows are separated by L mm in the sub-scanning direction. Hereafter, the plural nozzles 48a in the row at the conveyance direction upstream side are referred to as nozzle group A, and the plural nozzles 48a in the row at the conveyance direction downstream side are referred to as nozzle group B.

Figure 3:
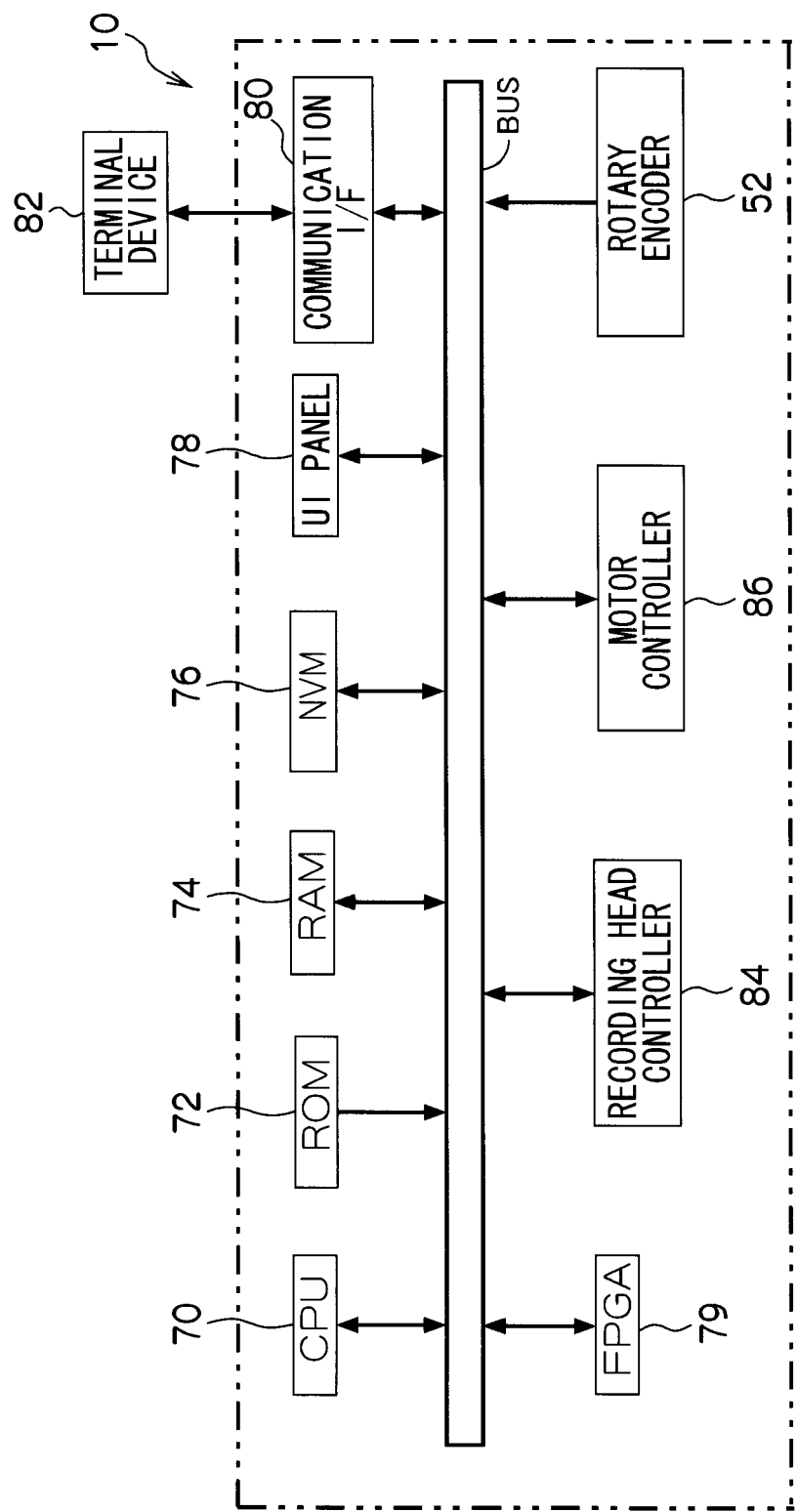
FIG. 3 is a block diagram illustrating principal structures of an electronic system of the image forming device relating to the first exemplary embodiment of the present invention.

FIG. 3 is a block diagram illustrating principal structures of an electronic system of the image forming device 10 relating to the present exemplary embodiment.

The image forming device 10 is structured to include a CPU (central processing unit) 70, a ROM (read-only memory) 72, a RAM (random access memory) 74, an NVM (non-volatile memory) 76, a UI (user interface) panel 78, an FPGA (field-programmable gate array) 79 and a communication I/F (communication interface) 80. In the present exemplary embodiment, an apparatus including this computer and the rotary encoder 52 serves as a speed calculation device that features a function of calculating a speed relating to rotation of the image forming drum 44 serving as the rotating body.

The CPU 70 administers operations of the image forming device 10 as a whole. The CPU 70 reads a program from the ROM 72 and executes image formation control processing.

The ROM 72 serves as a memory component and memorizes beforehand: a program for executing the image formation control processing that controls operations of the image forming device 10, which is described in detail hereafter; the rotation angle $\theta_0$ that is represented by one pulse of the pulse signals outputted from the rotary encoder 52; a distance between the peripheral face of the image forming drum 44 (peripheral face of the rotating body) and the axial center of the image forming drum 44 (referred to hereafter in the present exemplary embodiment as distance $R_0$); a distance between neighboring dots (herein, between centers of the dots; referred to hereafter in the first exemplary embodiment as distance $X_0$); and various parameters and the like. In the present exemplary embodiment, a radius of the image forming drum 44 is employed as the pre-specified distance $R_0$ but this is not limiting and another value may be employed.

The RAM 74 is used as a work area during execution of various programs and the like. The NVM 76 memorizes various kinds of information that need to be retained when a power switch of the device is turned off.

The UI panel 78 is structured by a touch panel display, in which a transparent touch panel is superposed on a display, or the like. The UI panel 78 displays various kinds of information at a display screen of the display, and inputs required information, instructions and the like in accordance with a user touching the touch panel.

The FPGA 79 reads a program from the ROM 72 and executes the speed calculation processing.

The communication interface 80 is connected with a terminal device 82, such as a personal computer or the like, and receives image information representing an image to be formed at the recording paper W and various other kinds of information from the terminal device 82.

The CPU 70, the ROM 72, the RAM 74, the NVM 76, the UI panel 78, the FPGA 79 and the communication interface 80 are connected to one another via a system bus. Therefore, the CPU 70 may implement each of access to the ROM 72, the RAM 74 and the NVM 76, display of various kinds of information at the UI panel 78, acquisition of details of control instructions from users from the UI panel 78, reception of various kinds of information from the terminal device 82 via the communication interface 80, and control of the FPGA 79.

The image forming device 10 is further provided with a recording head controller 84 and a motor controller 86.

The recording head controller 84 controls operations of the inkjet recording head 48 in accordance with instructions from the CPU 70. The motor controller 86 controls operations of the motor 30.

The recording head controller 84 and the motor controller 86 are also connected to the above-mentioned system bus. Thus, the CPU 70 may implement control of operations of the recording head controller 84 and the motor controller 86.

The aforementioned rotary encoder 52 is also connected to the aforementioned system bus. Thus, the CPU 70 may receive the plural pulse signals generated by the rotary encoder 52.

Next, operation of the image forming device 10 relating to the present exemplary embodiment will be described.

In the image forming device 10 relating to the present exemplary embodiment, recording paper W is fed out from the accommodation section 26 to the intermediate conveyance drum 28A by the paper supply apparatus, the recording paper W is conveyed via the intermediate conveyance drum 28A, the processing fluid application drum 36 and the intermediate conveyance drum 28B to the image forming drum 44, and is retained at the peripheral face of the image forming drum 44. Then, ink droplets are ejected at the recording paper W on the image forming drum 44 from the nozzles 48a of the inkjet recording head 48 in accordance with image information. Thus, an image represented by the image information is formed on the recording paper W.

Figure 4:
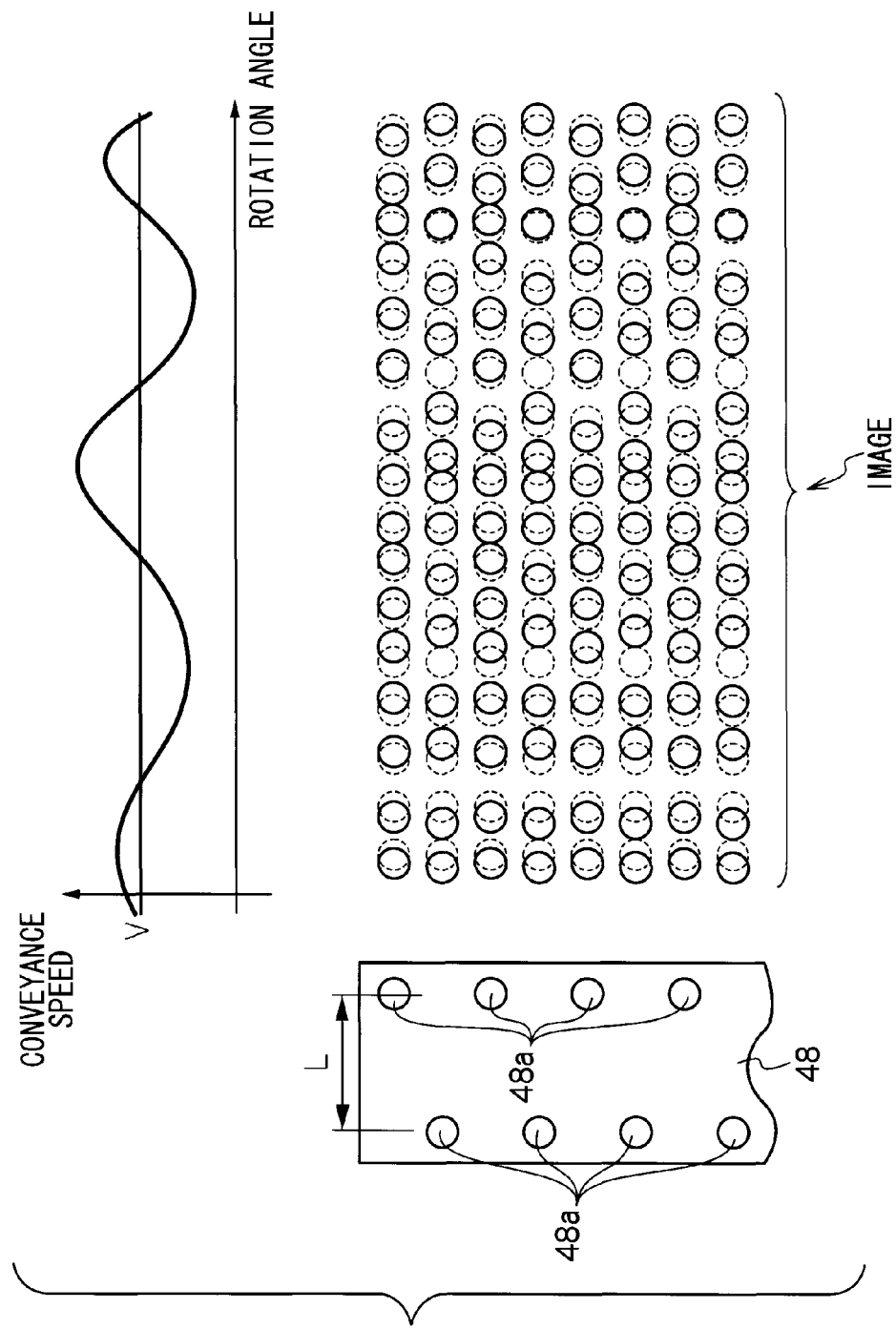
FIG. 4 is schematic views illustrating an example of variations in conveyance speed associated with increasing rotation angle of an image forming drum of the image forming device relating to the first exemplary embodiment of the present invention and an example of a situation in which impact positions of ink droplets are altered due to the variations.

Now, a conveyance speed of the recording paper W that is retained at the peripheral face of the image forming drum 44 varies as is shown by the example in the graph of FIG. 4, for reasons such as variations in meshing and loading of the driving system gears and variations in speed of the motor itself. The vertical axis of the graph in FIG. 4 shows the conveyance speed of the recording paper W at the image forming drum 44, and the horizontal axis shows the rotation angle of the image forming drum 44 from the pre-specified reference position. The broken line circles in the image in FIG. 4 illustrate an example of impact positions of ink droplets ejected from the nozzles 48a in a case in which the conveyance speed of the recording paper W is constant at a speed V. The solid line circles in the image in FIG. 4 illustrate an example of impact positions of the ink droplets ejected from the nozzles 48a in a case in which there are variations in speed of the recording paper W.

In conditions in which the conveyance speed of the recording paper W at the image forming drum 44 varies in this manner, clock signals of constant frequency are outputted to the inkjet recording heads 48, and when the ink droplets are ejected from the nozzles 48a at the inkjet recording heads 48 synchronously with these clock signals, an image that is formed by the ink droplets is deformed as shown in the example in FIG. 4.

Now, in order to suppress deformation of images due to speed variations, detecting or calculating the conveyance speed of the recording paper W and altering the frequency of the clock signals in accordance with the conveyance speed may be considered. In order to detect or calculate the conveyance speed of the recording paper W accurately, it is necessary to improve tracking of variations of the rotation speed of the image forming drum 44. Employing an encoder that generates pulse signals with high frequency for the rotary encoder 52 may be considered for improving tracking of variations in the rotation speed of the image forming drum 44. This is because it is thought that, when the rotary encoder 52 that generates pulse signals with high frequency is employed, a detection interval of the rotation speed of the image forming drum 44 is shorter and tracking of variations of the rotation speed of the image forming drum 44 improves. However, when the frequency is higher, a period of the pulse signals that are outputted from the rotary encoder 52 is shorter and measurement accuracy falls.

Accordingly, in the image forming device 10 relating to the present exemplary embodiment, in order to suppress deformation of an image due to variations in speed, the speed calculation processing is executed in order to improve tracking of variations in a speed relating to rotation of the image forming drum 44 and to calculate the speed relating to rotation of the image forming drum 44 with high accuracy.

Next, referring to FIG. 5, the image formation control processing that is executed by the CPU 70 of the image forming device 10 will be described. In the present exemplary embodiment, the image formation control processing is executed when an instruction for execution of the image formation processing, for forming an image at the recording paper W, and image information of an image formation subject are inputted from the terminal device 82 via the communication I/F 80 and the CPU 70 determines that this execution instruction and image information have been inputted.

Firstly, in step 100, an instruction to commence execution of the speed calculation processing is outputted to the FPGA 79, and the FPGA 79 performs control so as to commence execution of the speed calculation processing.

Now the speed calculation processing that is executed by the FPGA 79 will be described referring to FIG. 6.

Firstly, in step 200, the rotation angle $\theta_0$ and the distance $R_0$ are read out from the ROM 72.

Then, in step 202, the motor controller 86 is controlled such that the image forming drum 44 commences rotary driving. Hence, the image forming drum 44 commences rotary driving due to the motor controller 86 controlling the motor 30 so as to commence the rotary driving.

Next, in step 204, the processing waits until the image forming drum 44 reaches a predetermined rotation speed (for example, 500 mm/s). Here, the judgement of whether or not the image forming drum 44 has reached the predetermined rotation speed is determined on the basis of pulse signals from the rotary encoder 52. When it is judged in step 204 that the image forming drum 44 has reached the predetermined rotation speed, the processing advances to the next step 206.

Then, in step 206, variables—a variable i, a variable T0, a variable T1, a variable T2, a variable T3 and a variable E1—are initialized by setting values of the variables to zero.

Next, in step 208, a timer is started for measuring a duration from a previous detection in the processing of step 210, details of which are described below, until a next detection. Accordingly, the duration is measured in unit time intervals (for example, of 10 ns (nanoseconds)), and the duration that is measured each time the measured duration is updated is put into the variable i. More specifically, the duration is computed from a clock count of a counter installed at the FPGA 79.

Then, in step 210, rises and falls of the respective pulses of the two pulse signals of phase A and phase B outputted from the rotary encoder 52 are detected for. Accordingly, when a pulse of either of the two pulse signals with phase A and phase B rises, the rise of the pulse of that signal is detected, and when a pulse of either of the two pulse signals with phase A and phase B falls, the fall of the pulse of that signal is detected.

Next, in step 212, it is judged whether or not a rise of a pulse has been detected or a fall of a pulse has been detected in step 210. If it is judged in step 212 that a pulse rise has been detected or a pulse fall has been detected in step 210, the processing advances to the next step 214. On the other hand, if it is judged in step 212 that no pulse rise has been detected and no pulse fall has been detected in step 210, the processing returns to step 210, and rises and falls of the respective pulses of the two pulse signals with phase A and phase B outputted from the rotary encoder 52 are again detected for.

In step 214, the value of variable T0 is updated by putting the value of variable T1 into variable T0, the value of variable T1 is updated by putting the value of variable T2 into variable T1, the value of variable T2 is updated by putting the value of variable T3 into variable T2, and the value of variable T3 is updated by putting the value of variable i into variable T3. Then the value of variable E1 is updated by putting the sum of the value of variable T0, the value of variable T1, the value of variable T2 and the value of variable T3 (T0+T1+T2+T3) into variable E1. Then, initialization is performed by stopping the timer that started in step 208 and setting the value of variable i to zero. Here, if the detection of a pulse rise or detection of a pulse fall in the most recent processing of step 210 is a first (initial) detection, the value of variable i that has been put into variable T3 in the present step 214 is the duration from the present speed calculation processing starting until a first detection. If the detection of a pulse rise or detection of a pulse fall in the most recent processing of step 210 is a second or subsequent detection, this value of variable i is the duration from the previous detection by the processing of step 210 to the current detection by the processing of step 210. That is, in step 214, each time a rise or fall is detected in step 210, the duration E1 is calculated, which is a total of durations (T0, T1, T2 and T3) representing detection intervals of the rises and falls that have been detected in a pre-specified number (T0 to T3 being four thereof) prior to the current rise or fall detected in step 210.

Then, in step 216, by determining whether or not all the values of variable T0, variable T1, variable T2 and variable T3 are greater than zero, it is determined whether or not information that will be required when calculating a speed in step 218, details of which are described below, is all present.

In step 216, if it is judged that there is a variable among all the variables of variable T0, variable T1, variable T2 and variable T3 whose value is zero, it is determined that all the information that would be required when calculating the speed in step 218 whose details are described below is not present, and the processing returns to step 208. On the other hand, if it is judged that the values of all the variables of variable T0, variable T1, variable T2 and variable T3 are greater than zero, it is determined that all the information that will be required when calculating the speed in step 218 whose details are described below is present, and the processing advances to the next step 218.

In step 218, a speed relating to rotation of the image forming drum 44 is calculated on the basis of the total duration E1 computed in step 214 and the rotation angle $\theta_0$ of the image forming drum 44 that corresponds to one pulse of the pulse signals. More specifically, in step 218, a peripheral face speed V of the image forming drum 44 is calculated by dividing a movement distance ($R_0\theta_0$) of the peripheral face of the image forming drum 44 through the rotation angle $\theta_0$ by the total duration E1, as in the following equation (1).

$$V=(R_0\theta_0)/E1 \qquad \text{Equation (1)}$$

Then, in step 220, the value of the peripheral face speed V calculated in step 218 is outputted (reported) to the CPU 70.

Next, in step 222, it is judged whether or not an instruction to stop execution of the speed calculation processing has been received from the CPU 70. If it is judged in step 222 that an instruction to stop execution of the speed calculation processing has not been received, the processing returns to step 208.

On the other hand, if it is judged in step 222 that an instruction to stop execution of the speed calculation processing has been received, the present speed calculation processing ends.

Figure 5:
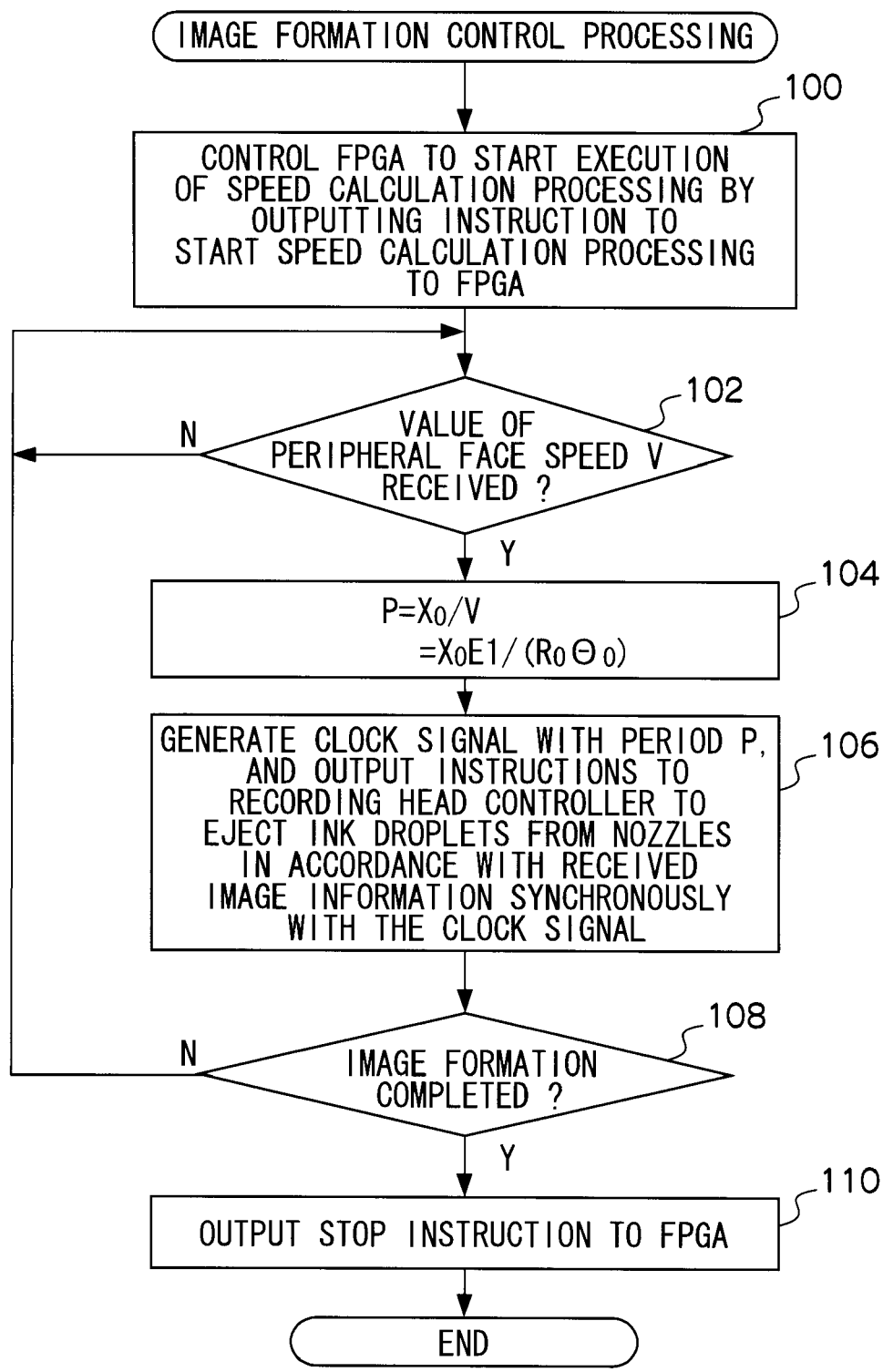
FIG. 5 is a flowchart of image formation control processing that is executed by a CPU of the first exemplary embodiment of the present invention.

Now the description of the image formation control processing shown in FIG. 5 is resumed. In the next step 102, it is determined whether or not a value of the peripheral face speed V has been received from the FPGA 79. The determination processing of step 102 is repeated until reception is determined. When reception is determined in step 102, the processing advances to the next step 104.

Then, in step 104, the distance $X_0$ is read from the ROM 72, and the peripheral face speed calculated by the speed calculation processing is used to calculate, with the following equation (2), a period P of the clock signal that prescribes timings of ejections of ink droplets from the nozzles 48a.

$$P=X_0/V=X_0E1/(R_0\theta_0) \qquad \text{Equation (2)}$$

Then, in step 106, a clock signal with the calculated period P is generated and instructions to eject ink droplets from the nozzles 48a, synchronously with this clock signal, are outputted to the recording head controller 84 in accordance with the received image information. Hence, the recording head controller 84 controls the nozzles 48a so as to eject droplets in accordance with the received image information synchronously with this clock signal. Thus, an image represented by the image information is formed at the recording face of the recording paper W without being affected by changes in the conveyance speed of the recording paper W.

Next, in step 108, it is judged whether or not image formation with the received image information has ended. If this judgement is negative, the processing returns to step 102. On the other hand, if the judgement in step 108 is positive, the processing advances to the next step 110. In step 110, an instruction to stop execution of the speed calculation processing is outputted to the FPGA 79. Then, the image formation control processing ends.

Figure 7A:
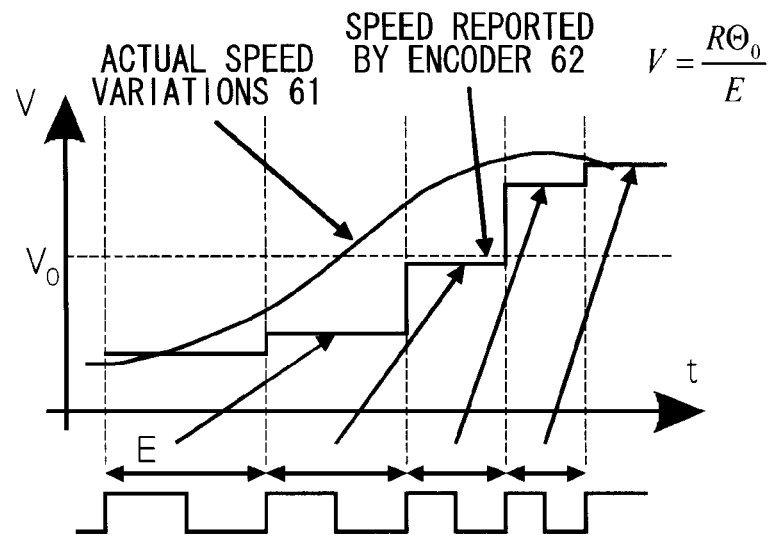
FIG. 7A is an image forming device equipped only with a related technology.
Figure 7B:
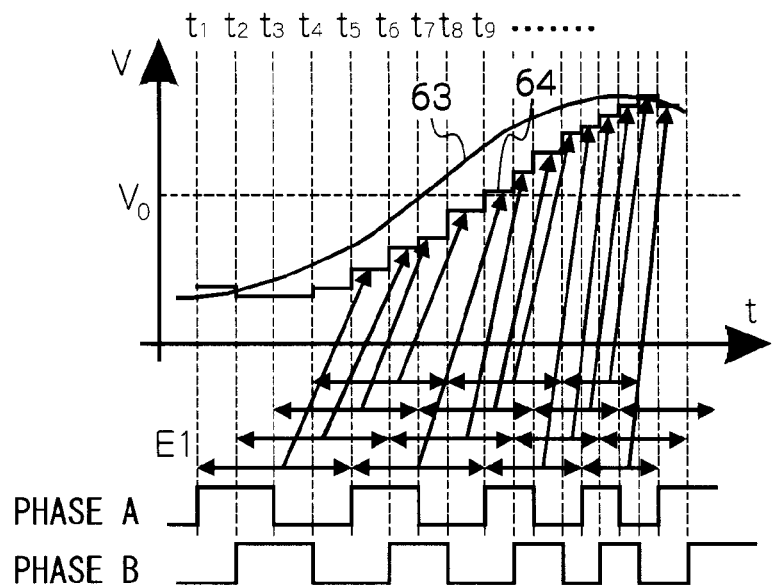
FIG. 7B is an image forming device relating to the first exemplary embodiment of the present invention.

The speed calculation device of the image forming device 10 of the present exemplary embodiment as described above is constituted to include the rotary encoder 52 to serve as a generation component that generates plural pulse signals with different phases (in the present exemplary embodiment, the pulse signals with phase A and phase B) in accordance with rotation of the image forming drum 44 which serves as the rotating body that rotates. The speed calculation device of the image forming device 10 of the present exemplary embodiment detects rises and falls of respective pulses of the plural pulse signals generated by the rotary encoder 52 in step 210. Then the speed calculation device of the image forming device 10 of the present exemplary embodiment, each time a rise or fall is detected in step 210, calculates, in step 214, the total duration E1 of durations (T0, T1, T2 and T3) representing detection intervals of the rises and falls detected in the pre-specified number (T0, T1, T2 and T3 being four) prior to the current rise or fall detected in step 210. Hence, the speed calculation device of the image forming device 10 of the present exemplary embodiment calculates a speed relating to rotation of the image forming drum 44 in step 218 on the basis of the total duration E1 and the rotation angle $\theta_0$ of the image forming drum 44 that corresponds to one pulse of the pulse signals generated by the rotary encoder 52. More specifically, the peripheral face speed V of the image forming drum 44 is calculated in step 218 by dividing the movement distance ($R_0\theta_0$) of the peripheral face of the image forming drum 44, through the rotation angle $\theta_0$ of the image forming drum 44 that corresponds to one pulse of the pulse signals, by the total duration E1. Further, the image forming device 10 of the present exemplary embodiment is constituted to include inkjet recording heads 48 in which the nozzles 48a that serve as plural image forming elements, which form dots that respectively constitute an image at a predetermined surface synchronously with a clock signal, are arranged. The image forming drum 44 rotates with the peripheral face thereof opposing the plural nozzles 48a in the state in which the recording paper W, which serves as the recording medium, is retained at the peripheral face of the image forming drum 44, such that the image is formed at the recording paper W by the respective plural nozzles 48a. The image forming device 10 of the present exemplary embodiment calculates a period P of the clock signal in step 104 on the basis of the peripheral face speed V calculated by the speed calculation device and the distance $X_0$ between neighboring dots. Accordingly, if, for example, tracking of variations of the peripheral face speed V of an image forming drum as represented by a speed 62, which is detected on the basis of pulse signals from a rotary encoder by an image forming device that is provided only with a related technology, for an actual speed V shown in FIG. 7A (61) is compared with tracking of variations of the peripheral face speed V of the image forming drum 44 as represented by a speed 64, which is detected on the basis of plural pulse signals from the rotary encoder 52 by the speed calculation device of the image forming device 10 of the present exemplary embodiment, for an actual speed V shown in FIG. 7B (63), it is understood that the image forming device 10 of the present exemplary embodiment is more excellent after a time $t_6$.

Figure 8:
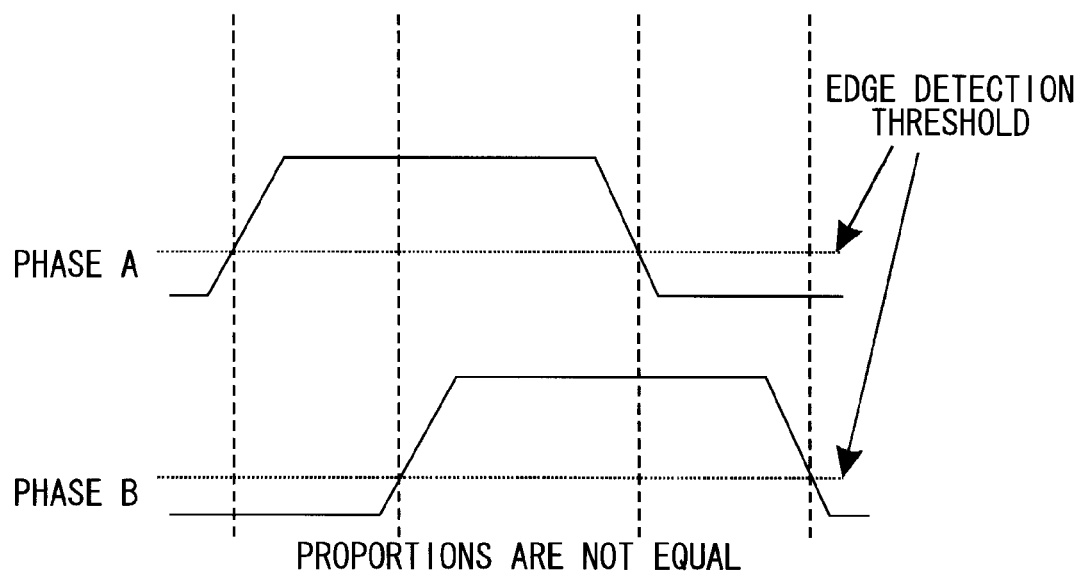
FIG. 8 is a diagram for explaining a reduction in measurement accuracy when a measurement period is shortened.

In the above description, an example is described of calculating the peripheral face speed using the total duration E1 of the pre-specified number (T0, T1, T2 and T3 being four) of durations (T0, T1, T2 and T3) representing detection intervals of rises and falls that are detected. A method that gets closer to variations of the actual peripheral face speed of the image forming drum 44 by calculating the peripheral face speed using the durations that represent detection intervals (T0, T1, T2 and T3) may be considered. However, with such a method, accuracy of the calculated peripheral face speed falls for the reason described below. This reason will be described using FIG. 8. FIG. 8 shows pulses of the pulse signals with phase A and phase B that are outputted from the rotary encoder and thresholds (limits) of FPGA edge detection (detection of a rise or fall). The output pulses of the rotary encoder are slightly sloped. If, for example, the threshold is lower than a midpoint of the pulse voltages as shown in FIG. 8, then rise-to-fall intervals will be shorter than fall-to-rise intervals. In addition, phases of phase A and phase B depend on positional accuracy of detectors (which here are detectors of the rotary encoder). Therefore, if one pulse is divided into four, the phase differences will not be precisely 90°. That is, a single pulse will not be strictly equally divided. Therefore, if the period P of a clock signal is calculated with the above-mentioned method and the clock signal with the calculated period P is used during image formation, accuracy will fall. For this reason, it is preferable to use the total duration E1 to calculate the peripheral face speed V.

Figure 9:
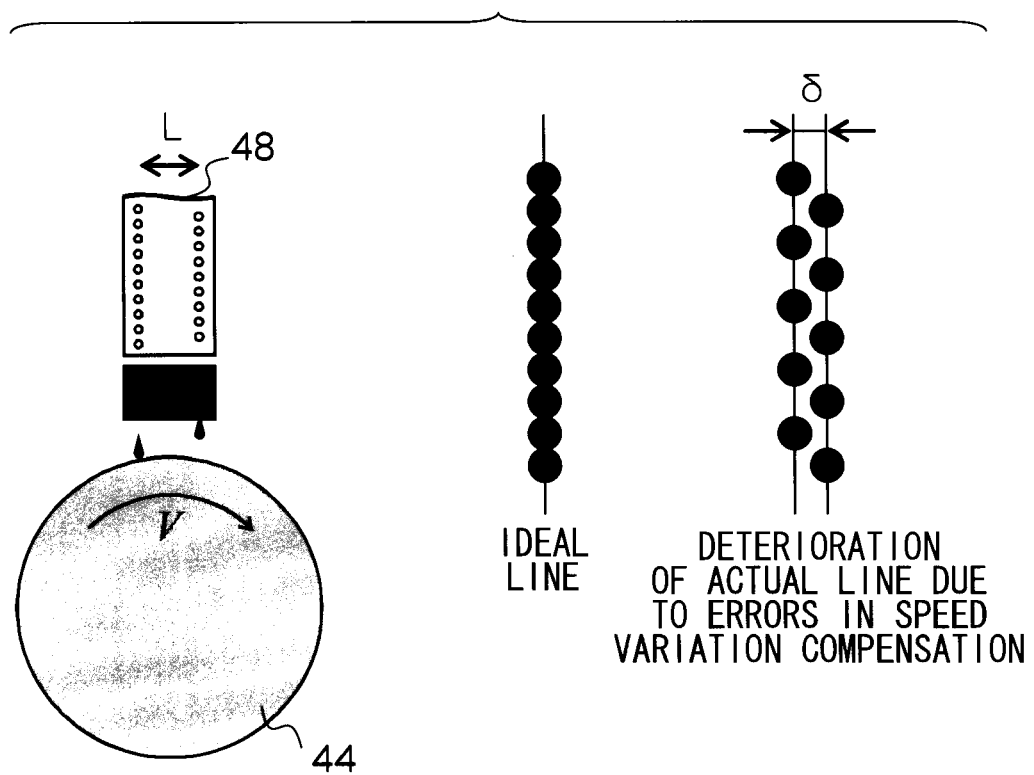
FIG. 9 is views of cases in which a single dot line is drawn in a main scanning direction.

With the image forming device equipped with the related technology and the image forming device 10 of the present exemplary embodiment, as shown in FIG. 9, a single dot line (single line) was drawn in the main scanning direction and an offset of the dots δ was measured. Measurement results are shown below in table 1.

TABLE 1

| | Dot offset δ |
|---|---|
| Phase A rise (conventional) | 3.3 μm |
| Detecting rises and falls of phases A and B | 2.2 μm |

As shown in table 1, with the image forming device equipped with the related technology, the dot offset δ was 3.3 μm and with the image forming device 10 of the present exemplary embodiment, the dot offset δ was 2.2 μm.

Conditions here are as shown below.
Conditions
Rotation speed $V_0$: 200 mm/s
Printing drum (image forming drum) radius R: 100 mm
Speed variation ΔV: 1%
Speed variation frequency: 5 Hz
2-dimensional head nozzle spacing L: 4 mm
Rotary encoder: 500 pulses/revolution
FPGA clock frequency: 20 MHz —Second Exemplary Embodiment—

Next, a second exemplary embodiment will be described. Portions of the present exemplary embodiment that are the same as in the first exemplary embodiment are assigned the same reference numerals and will not be described.

Figure 6:
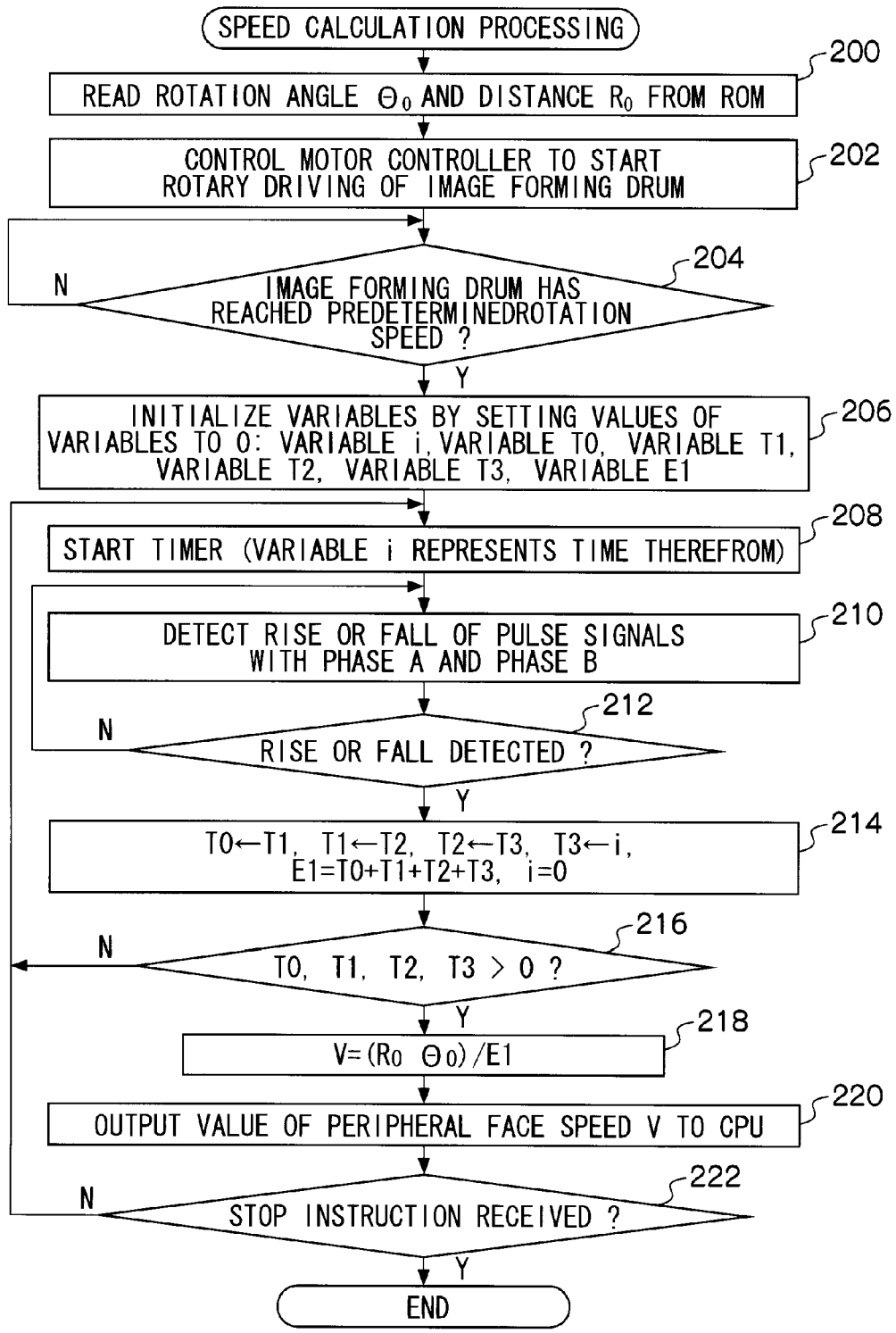
FIG. 6 is a flowchart of speed calculation processing that is executed by an FPGA of the first exemplary embodiment of the present invention.
Figure 10:
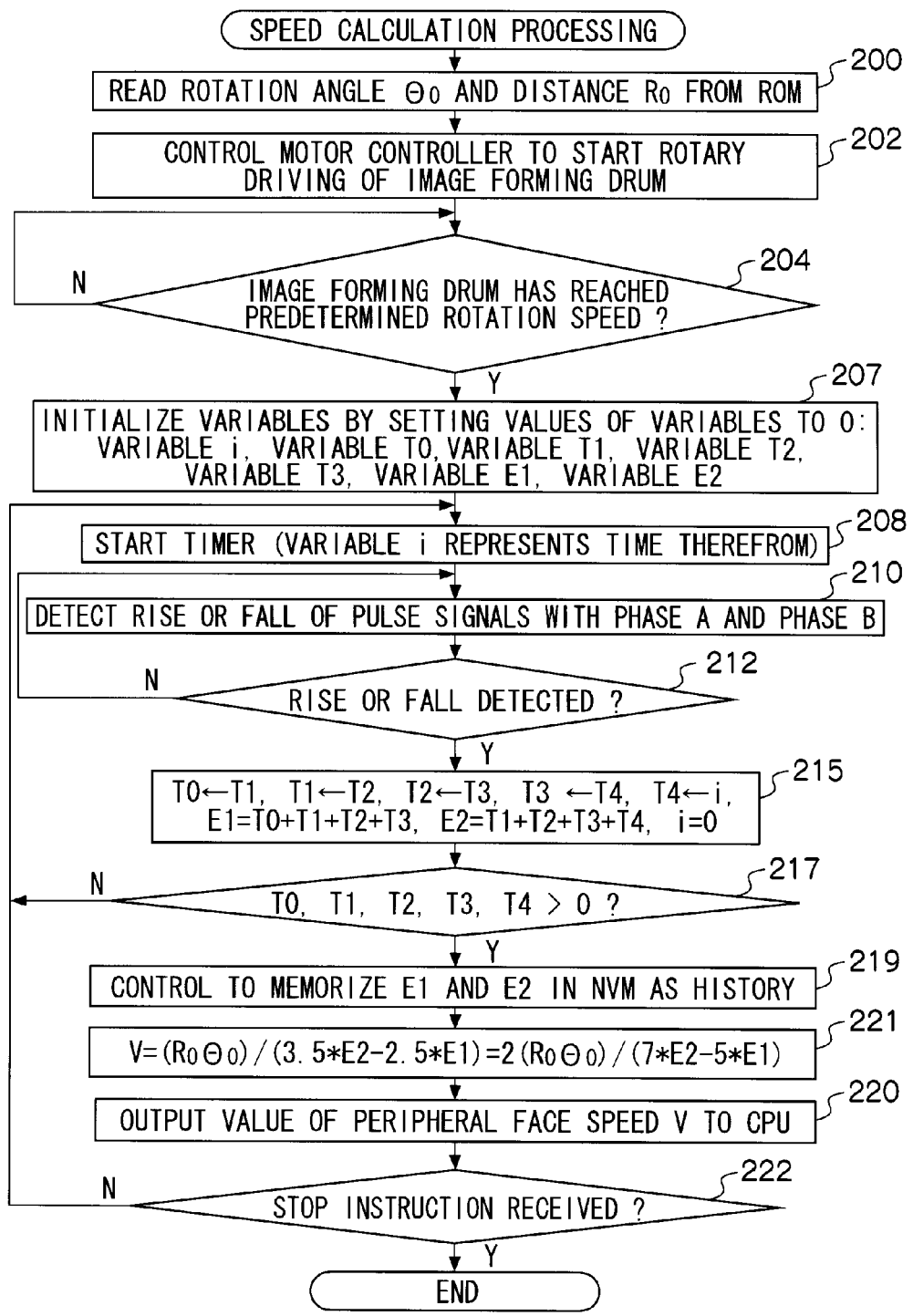
FIG. 10 is a flowchart of speed calculation processing that is executed by an FPGA of a second exemplary embodiment of the present invention.

In the first exemplary embodiment, an example is described in which the program for executing the speed calculation processing shown in FIG. 6 is memorized in the ROM 72, and the FPGA 79 reads the program from the ROM 72 and executes the speed calculation processing shown in FIG. 6. In the present exemplary embodiment, a program for executing speed calculation processing shown in FIG. 10 is memorized in the ROM 72 in advance, and the FPGA 79 reads this program from the ROM 72 and executes the speed calculation processing shown in FIG. 10.

Now the speed calculation processing that is executed by the FPGA 79 of the present exemplary embodiment will be described referring to FIG. 10.

Steps 200, 202 and 204 (steps 200 to 204) are the same as in the first exemplary embodiment, so will not be described. In the present exemplary embodiment, after step 204 the processing advances to step 207. In step 207, variables—a variable i, a variable T0, a variable T1, a variable T2, a variable T3, a variable T4, a variable E1 and a variable E2—are initialized by setting the values of the variables to zero.

Next, in step 208, the same as in the first exemplary embodiment, a timer is started for measuring a duration from a previous detection in the processing of step 210, details of which are described below, until a next detection.

Then, in step 210, the same as in the first exemplary embodiment, rises and falls of the respective pulses of the two pulse signals of phase A and phase B outputted from the rotary encoder 52 are detected for.

Next, in step 212, the same as in the first exemplary embodiment, it is judged whether or not a rise of a pulse has been detected or a fall of a pulse has been detected instep 210. If it is judged in step 212 that a pulse rise has been detected or a pulse fall has been detected in step 210, the processing advances to the next step 215. On the other hand, if it is judged in step 212 that no pulse rise has been detected and no pulse fall has been detected in step 210, the processing returns to step 210, and rises and falls of the respective pulses of the two pulse signals with phase A and phase B outputted from the rotary encoder 52 are again detected for.

In step 215, the value of variable T0 is updated by putting the value of variable T1 into variable T0, the value of variable T1 is updated by putting the value of variable T2 into variable T1, the value of variable T2 is updated by putting the value of variable T3 into variable T2, the value of variable T3 is updated by putting the value of variable T4 into variable T3, and the value of variable T4 is updated by putting the value of variable i into variable T4. Then the value of variable E1 is updated by putting the sum of the value of variable T0, the value of variable T1, the value of variable T2 and the value of variable T3 (T0+T1+T2+T3) into variable E1, and the value of variable E2 is updated by putting the sum of the value of variable T1, the value of variable T2, the value of variable T3 and the value of variable T4 (T1+T2+T3+T4) into variable E2. Then, initialization is performed by stopping the timer that started in step 208 and setting the value of variable i to zero. Here, if the detection of a pulse rise or detection of a pulse fall in the most recent processing of step 210 is a first (initial) detection, the value of variable i that has been put into variable T4 in the present step 215 is the duration from the present speed calculation processing starting until a first detection. If the detection of a pulse rise or detection of a pulse fall in the most recent processing of step 210 is a second or subsequent detection, this value of variable i is the duration from the previous detection by the processing of step 210 to the current detection by the processing of step 210. That is, in step 215, each time a rise or fall is detected in step 210, the duration E1 is calculated, which is a total of durations (T0, T1, T2 and T3) representing detection intervals of the rises and falls that have been detected in a pre-specified number (T0 to T3 being four thereof) prior to the current rise or fall detected in step 210, in addition to which the duration E2 is calculated, which is a total of durations (T1, T2, T3 and T4) representing detection intervals of the rises and falls which have been detected in a pre-specified first number (T1 to T4 being four thereof) prior to the current rise or fall detected in step 210.

Then, in step 217, by determining whether or not all the values of variable T0, variable T1, variable T2, variable T3 and variable T4 are greater than zero, it is determined whether or not information that will be required when calculating a speed in step 221, details of which are described below, is all present.

In step 217, if it is judged that there is a variable among all the variables of variable T0, variable T1, variable T2, variable T3 and variable T4 whose value is zero, it is determined that all the information that would be required when calculating the speed in step 221 whose details are described below is not present, and the processing returns to step 208. On the other hand, if it is judged that the values of all the variables of variable T0, variable T1, variable T2, variable T3 and variable T4 are greater than zero, it is determined that all the information that will be required when calculating the speed in step 221 whose details are described below is present, and the processing advances to the next step 219.

In step 219, for each of the total durations E1 and E2 that have been calculated in step 215, control is performed so as to memorize the total durations E1 and E2 in the NVM 76, which serves as a memory component, in a pre-specified number (E1 and E2 being two in the present exemplary embodiment; this number is referred to as a third number) to serve as a history. Accordingly, the total durations E1 and E2 are memorized in the NVM 76.

Then, in step 221, a speed relating to rotation of the image forming drum 44 is calculated on the basis of, of the third number of total durations E1 and E2 memorized in the NVM 76, a second number of total durations E1 and E2 (E1 and E2 being two in the present exemplary embodiment) and the rotation angle $\theta_0$ of the image forming drum 44 that corresponds to one pulse of the pulse signal. More specifically, in step 221 a duration E, for calculating the speed relating to rotation of the image forming drum 44 (the peripheral face speed V in the present exemplary embodiment) that is to be calculated a next time, is estimated by linear extrapolation based on, of the third number of total durations E1 and E2 memorized in the NVM 76, the second number of total durations E1 and E2 (E1 and E2 being two in the present exemplary embodiment), and the peripheral face speed V of the image forming drum 44 is calculated by dividing the movement distance ($R_0\theta_0$) of the peripheral face of the image forming drum 44 through the rotation angle $\theta_0$ by the estimated duration E, as in the following equation (3).

$$V=(R_0\theta_0)/E \qquad \text{Equation (3)}$$

Then the processing advances to step 220 and subsequent processing the same as in the first exemplary embodiment is performed.

Now, the processing of step 221 will be more specifically described with reference to FIG. 11.

Figure 11:
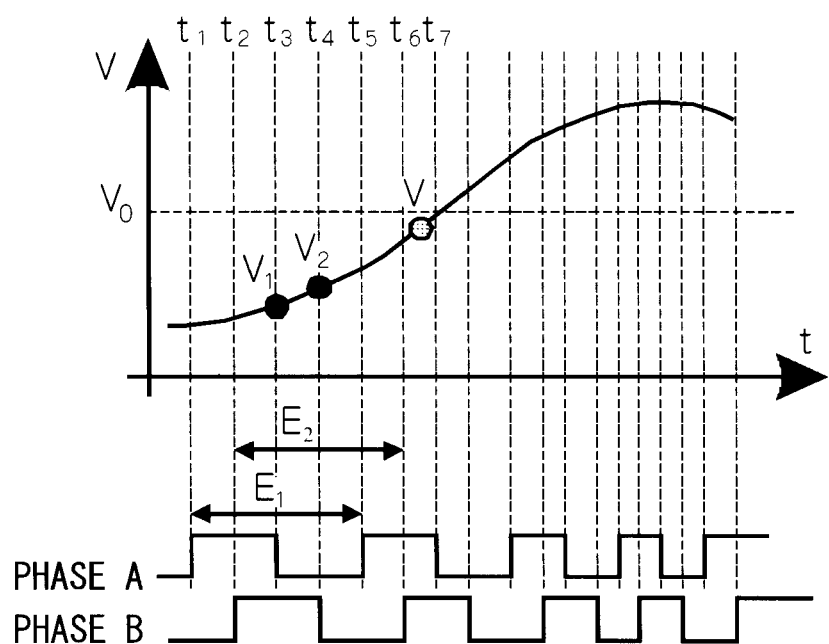
FIG. 11 is a graph for describing details of the speed calculation processing of the second exemplary embodiment.

As shown in FIG. 11, a period (total duration) represented by the most recent pulse signals from the rotary encoder 52 is E2, and a period (total duration) one step prior thereto is E1. A speed V1 ($=(R_0\theta_0)/E1$) calculated with E1 is an average speed over $t_1$-$t_5$, and a speed V2 ($=(R_0\theta_0)/E2$) calculated with E2 is an average speed over $t_2$-$t_6$. The speed V1 and the speed V2 correspond to speeds at times $t_3$ and $t_4$, respectively.

The speed to be estimated from E1 and E2 here is the speed V in the interval $t_6$-$t_7$. Assuming that intervals $t_i$-$t_{i+1}$ are substantially equal intervals, the speed V at an intermediate point during $t_6$-$t_7$ is represented by the following equation (4) according to linear extrapolation.

$$V=(R_0\theta_0)/(3.5*E2-2.5*E1)=2(R_0\theta_0)/(7*E2-5*E1) \qquad \text{Equation (4)}$$

Herein, "*" is a symbol representing multiplication. That is, "A*B" represents the product of A and B.

Figure 12:
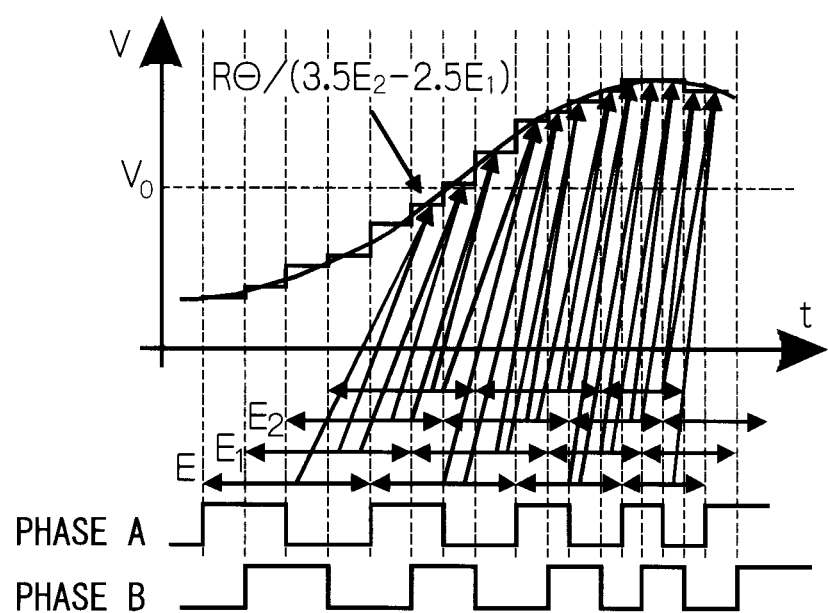
FIG. 12 is a graph for describing states of following of variations in a peripheral face speed V in the second exemplary embodiment.

States of tracking of variations of the peripheral face speed V in such a case are as shown in FIG. 12.

Then the processing advances to step 220 and subsequent processing the same as in the first exemplary embodiment is performed.

Here, the period P of the clock signal that is calculated in step 102 of the present exemplary embodiment is as in the following equation (5).

$$\begin{aligned} P &= X_0/V \\ &= X_0(3.5*E2-2.5*E1)/(R_0\theta_0) \\ &= X_0(7*E2-5*E1)/2(R_0\theta_0) \end{aligned} \qquad \text{Equation (5)}$$

In the above description, a speed at an intermediate point during $t_6$-$t_7$ is estimated. However, a speed at $t_6$ may be estimated to serve as a representative speed V. In step 221 in this case, the total duration E calculated for the next time thereafter is estimated by linear extrapolation based on, of the pre-specified third number of total durations E1 and E2 memorized in the NVM 76, the second number of total durations E1 and E2 (E1 and E2 being two in the present exemplary embodiment), and the peripheral face speed V of the image forming drum 44 is calculated by dividing the movement distance ($R_0\theta_0$) of the peripheral face of the image forming drum 44 through the rotation angle $\theta_0$ by this estimated total duration E. The period P of the clock signal that is calculated in step 102 in this case is represented by the following equation (6).

$$P=X_0/V=X_0(3*E2-2*E1)/(R_0\theta_0) \qquad \text{Equation (6)}$$

Similarly, a speed at $t_7$ may be estimated to serve as a representative speed V. In step 221 in this case, the total duration E calculated for the next time thereafter is estimated by linear extrapolation based on, of the pre-specified third number of total durations E1 and E2 memorized in the NVM 76, the second number of total durations E1 and E2 (two of E1 and E2 in the present exemplary embodiment), and the peripheral face speed V of the image forming drum 44 is calculated by dividing the movement distance ($R_0\theta_0$) of the peripheral face of the image forming drum 44 through the rotation angle $\theta_0$ by this estimated total duration E. The period P of the clock signal that is calculated in step 102 in this case is represented by the following equation (7).

$$P = X_0/V = X_0(4*E2 - 3*E1)/(R_0\theta_0) \quad \text{Equation (7)}$$

With the image forming device equipped with the related technology and the image forming device 10 of the present exemplary embodiment, a single dot line (single line) was drawn in the main scanning direction, as shown in FIG. 9, and an offset of the dots δ was measured. Measurement results are shown below in table 2.

TABLE 2

| | Dot offset δ |
|---|---|
| Phase A rise (conventional) | 3.3 μm |
| Detecting rises and falls of phases A and B + extrapolation | 1.5 μm |

As shown in table 2, with the image forming device equipped with the related technology, the dot offset δ was 3.3 μm, and with the image forming device 10 of the present exemplary embodiment, the dot offset δ was 1.5 μm.

Conditions in this case are the same as those described for table 1.

The speed calculation device of the image forming device 10 of the present exemplary embodiment as described above, each time a rise or fall is detected in step 210, calculates, in step 215, the totals E1 and E2 of durations (T0 to T3 and T1 to T4) representing detection intervals of rises and falls detected in the pre-specified first number (T0, T1, T2 and T3 being four and T1, T2, T3 and T4 being four) prior to the current rise or fall detected in step 210. For each of the calculated total durations E1 and E2, control is performed in step 219 to memorize a pre-specified number (two in the present exemplary embodiment) of total durations E1 and E2 in the NVM 76 as a history. The duration E is estimated on the basis of, of the pre-specified number of total durations E1 and E2 memorized in the NVM 76, the second number (two in the present exemplary embodiment) of total durations E1 and E2, and the peripheral face speed V of the image forming drum 44 is calculated in step 221 by dividing the movement distance ($R_0\theta_0$) of the peripheral face of the image forming drum 44 through the rotation angle $\theta_0$ by the estimated duration E.

Here, the pre-specified third number and second number may be numbers larger than two, and the duration E may be estimated by higher order extrapolation in step 221 on the basis of the second number of total durations. Furthermore, the pre-specified third number and second number need not be the same number. It is sufficient that the pre-specified third number be at least as large as the second number.

—Third Exemplary Embodiment—

Next, a third exemplary embodiment will be described. Portions of the present exemplary embodiment that are the same as in the first exemplary embodiment are assigned the same reference numerals and will not be described.

In the first exemplary embodiment, an example is described in which the programs for executing the image formation control processing shown in FIG. 5 and the speed calculation processing shown in FIG. 6 are memorized in the ROM 72, the CPU 70 reads the program from the ROM 72 and executes the image formation control processing shown in FIG. 5, and the FPGA 79 reads the program from the ROM 72 and executes the speed calculation processing shown in FIG. 6. In the present exemplary embodiment, programs for executing the image formation control processing shown in FIG. 13 and the speed calculation processing shown in FIG. 14 are memorized in the ROM 72 in advance, the CPU 70 reads the program from the ROM 72 and executes the image formation control processing shown in FIG. 13, and the FPGA 79 reads the program from the ROM 72 and executes the speed calculation processing shown in FIG. 14.

Now the image formation control processing that is executed by the CPU 70 of the present exemplary embodiment will be described referring to FIG. 13.

Firstly, the same as in the first exemplary embodiment, in step 100, an instruction to commence execution of the speed calculation processing is outputted to the FPGA 79, and the FPGA 79 performs control so as to commence execution of the speed calculation processing.

Now the speed calculation processing that is executed by the FPGA 79 of the present exemplary embodiment will be described referring to FIG. 14.

Firstly, in step 201, the rotation angle $\theta_0$ is read from the ROM 72. Then the processing advances to step 202.

Steps 202, 204, 206, 208, 210, 212, 214 and 216 (steps 202 to 216) are the same as in the first exemplary embodiment, so will not be described. In step 216 in the present exemplary embodiment, by judging whether or not all the values of variable T0, variable T1, variable T2 and variable T3 are greater than zero, it is determined (when the judgement is positive) when information that will be required when calculating a speed in step 230, details of which are described below, is all present, after which the processing advances to step 230.

In step 230, a speed relating to rotation of the image forming drum 44 is calculated on the basis of the duration E1 calculated in the earlier-described step 214 and the rotation angle $\theta_0$ of the image forming drum 44 that corresponds to one pulse of the pulse signal. More specifically, in step 230, an angular speed W of the image forming drum 44 is calculated by dividing the rotation angle $\theta_0$ by the duration E1, as in the following equation (8).

$$W = \theta_0/E1 \quad \text{Equation (8)}$$

Then, in step 232, the value of the angular speed W calculated in step 230 is outputted (reported) to the CPU 70. Then the processing advances to step 222.

Figure 13:
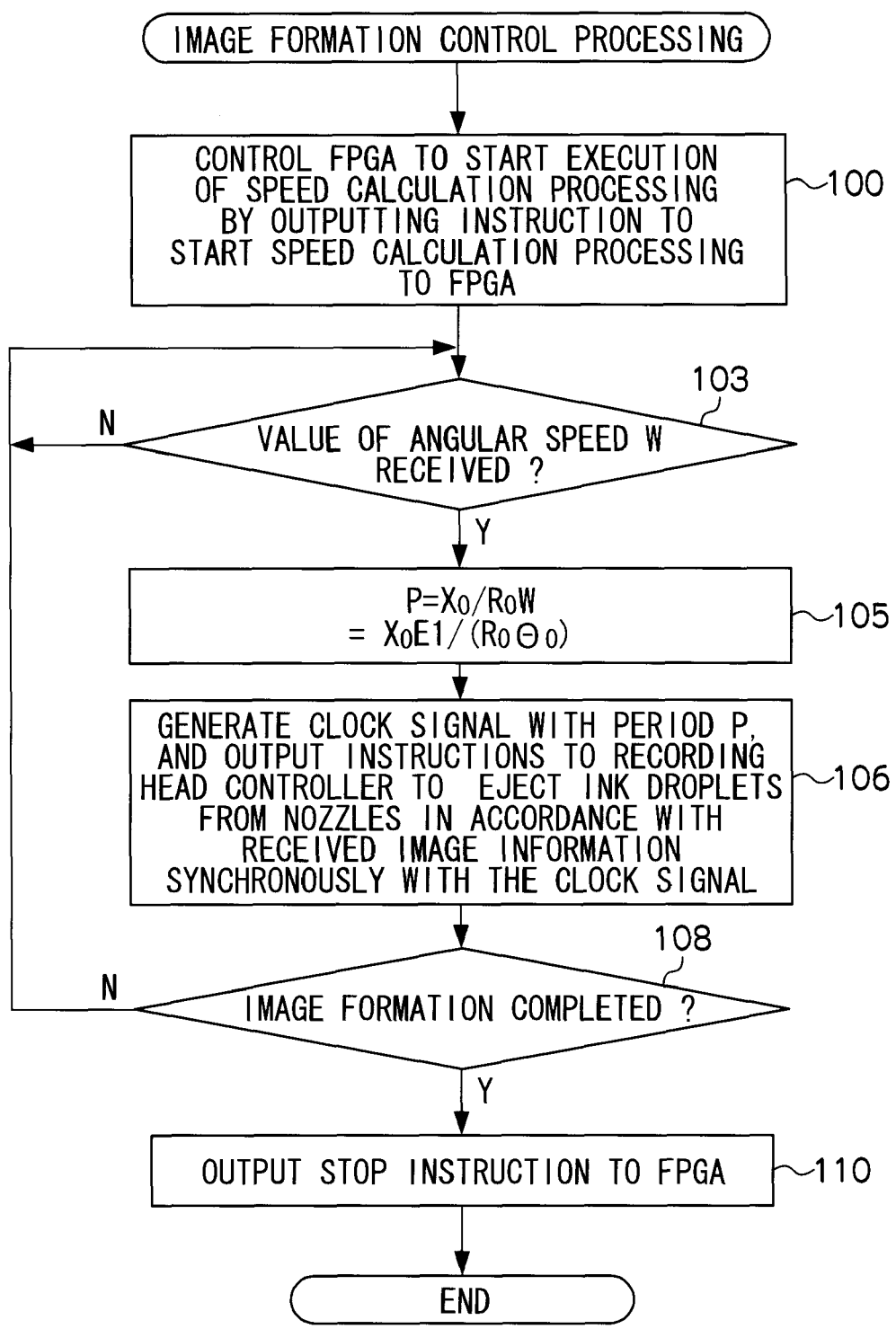
FIG. 13 is a flowchart of image formation control processing that is executed by a CPU of a third exemplary embodiment.
Figure 14:
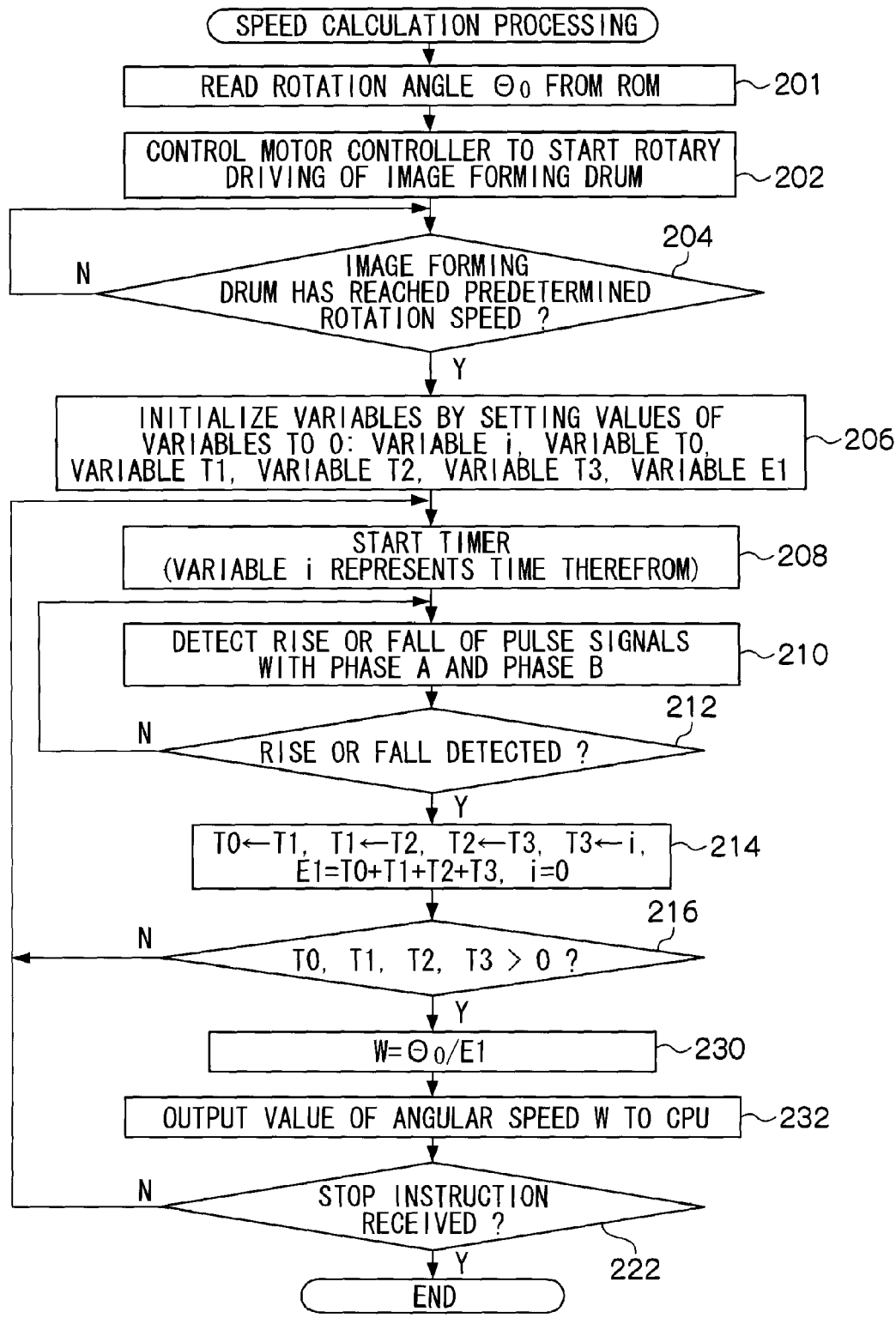
FIG. 14 is a flowchart of speed calculation processing that is executed by an FPGA of the third exemplary embodiment.

Now the description of the image formation control processing shown in FIG. 13 is resumed. In the next step 103, it is determined whether or not a value of the angular speed W has been received from the FPGA 79. The determination processing of step 103 is repeated until reception is determined. When reception is determined in step 103, the processing advances to the next step 105.

Then, in step 105, the distance $R_0$ and the distance $X_0$ are read from the ROM 72, and the angular speed W calculated in the above speed calculation processing is used to calculate, with the following equation (9), a period P of the clock signal that prescribes timings of ejections of ink droplets from the nozzles 48a.

$$P = X_0/R_0W = X_0E1/(R_0\theta_0) \quad \text{Equation (9)}$$

Then the processing advances to step 106, and subsequent processing the same as in the first exemplary embodiment is performed, except that the processing returns to step 103 when the determination of step 108 is negative in the present exemplary embodiment.

The speed calculation device of the image forming device 10 of the present exemplary embodiment as described above is constituted to include the rotary encoder 52 to serve as the generation component that generates plural pulse signals with different phases (in the present exemplary embodiment, the pulse signals with phase A and phase B) in accordance with rotation of the image forming drum 44 which serves as the rotating body that rotates. The speed calculation device of the image forming device 10 of the present exemplary embodiment detects rises and falls of respective pulses of the plural pulse signals generated by the rotary encoder 52 in step 210. Then the speed calculation device of the image forming device 10 of the present exemplary embodiment, each time a rise or fall is detected in step 210, calculates, in step 214, the total duration E1 of durations (T0, T1, T2 and T3) representing detection intervals of the rises and falls detected in the pre-specified number (T0, T1, T2 and T3 being four) prior to the current rise or fall detected in step 210. Hence, the speed calculation device of the image forming device 10 of the present exemplary embodiment calculates a speed relating to rotation of the image forming drum 44 in step 230 on the basis of the total duration E1 and the rotation angle $\theta_0$ of the image forming drum 44 corresponding to one pulse of the pulse signal generated by the rotary encoder 52. More specifically, the angular speed W of the image forming drum 44 is calculated in step 230 by dividing the rotation angle $\theta_0$ of the image forming drum 44 that corresponds to one pulse of the pulse signals by the total duration E1. Further, the image forming device 10 of the present exemplary embodiment is constituted to include inkjet recording heads 48 in which the nozzles 48a that serve as plural image forming elements, which form dots that respectively constitute an image at a predetermined surface synchronously with a clock signal, are arranged. The image forming drum 44 rotates with the peripheral face thereof opposing the plural nozzles 48a in the state in which the recording paper W, which serves as the recording medium, is retained at the peripheral face of the image forming drum 44, such that the image is formed at the recording paper W by the respective plural nozzles 48a. The image forming device 10 of the present exemplary embodiment calculates a period P of the clock signal in step 105 on the basis of the angular speed W calculated by the speed calculation device, the distance $R_0$ between the axis of the image forming drum 44 and the peripheral face of the image forming drum 44, and the distance $X_0$ between neighboring dots.

—Fourth Exemplary Embodiment—

Next, a fourth exemplary embodiment will be described. Portions of the present exemplary embodiment that are the same as in the first exemplary embodiment, the second exemplary embodiment and the third exemplary embodiment are assigned the same reference numerals and will not be described.

Figure 15:
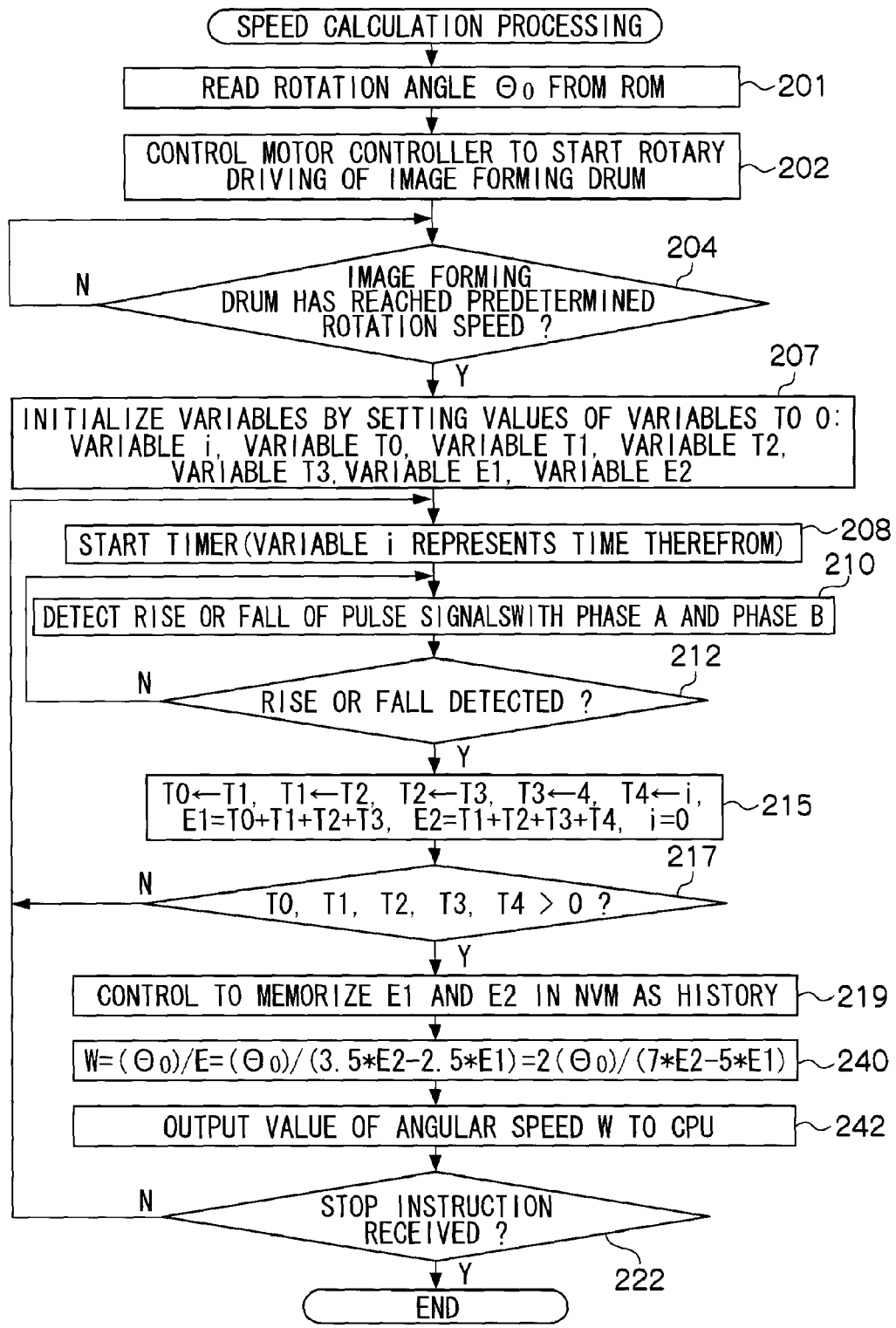
FIG. 15 is a flowchart of speed calculation processing that is executed by an FPGA of a fourth exemplary embodiment.

In the present exemplary embodiment, programs for executing the image formation control processing shown in FIG. 13 and the speed calculation processing shown in FIG. 15 are memorized in the ROM 72 in advance, the CPU 70 reads the program from the ROM 72 and executes the image formation control processing shown in FIG. 13, and the FPGA 79 reads the program from the ROM 72 and executes the speed calculation processing shown in FIG. 15.

Now the speed calculation processing that is executed by the FPGA 79 of the present exemplary embodiment will be described referring to FIG. 15.

Firstly, in step 201, the same as in the third exemplary embodiment, the rotation angle $\theta_0$ is read from the ROM 72. Then the processing advances to step 202.

Steps 202, 204, 207, 208, 210, 212, 215, 217 and 219 (steps 202 to 219) are the same as in the second exemplary embodiment, so will not be described. In the present exemplary embodiment, after step 219 the processing advances to step 240.

In step 240, a speed relating to rotation of the image forming drum 44 is calculated on the basis of the pre-specified second number of total durations E1 and E2 (E1 and E2 being two in the present exemplary embodiment) and the rotation angle $\theta_0$ of the image forming drum 44 that corresponds to one pulse of the pulse signal. More specifically, in step 240 a duration E, for calculating the speed relating to rotation of the image forming drum 44 (the angular speed W in the present exemplary embodiment) that is to be calculated a next time, is estimated by linear extrapolation similarly to the second exemplary embodiment, based on, of the total durations E1 and E2 memorized in the NVM 76, the pre-specified second number of total durations E1 and E2 (E1 and E2 being two in the present exemplary embodiment), and the angular speed W of the image forming drum 44 is calculated by dividing the rotation angle $\theta_0$ by the estimated duration E, as in the following equation (10).

$$W = \theta_0 / E \qquad \text{Equation (10)}$$
$$= \theta_0 / (3.5 * E2 - 2.5 * E1)$$
$$= 2\theta_0 / (7 * E2 - 5 * E1)$$

Then the processing advances to step 242. In step 242, the value of the angular speed W calculated in step 240 is outputted (reported) to the CPU 70. Then the processing advances to step 222 and subsequent processing the same as in the third exemplary embodiment is performed.

In the above description, a speed at an intermediate point during $t_6$-$t_7$ is estimated. However, a speed at $t_6$ may be estimated to serve as the representative speed W. The angular speed W calculated in step 240 in this case is represented by the following equation (11).

$$W = \theta_0 / (3*E2 - 2*E1) \qquad \text{Equation (11)}$$

Similarly, a speed at $t_7$ may be estimated to serve as the representative speed W. The angular speed W that is calculated in step 240 in this case is represented by the following equation (12).

$$W = \theta_0 / (4*E2 - 3*E1) \qquad \text{Equation (12)}$$

The speed calculation device of the image forming device 10 of the present exemplary embodiment as described above, each time a rise or fall is detected in step 210, calculates, in step 215, the durations of the totals E1 and E2 of durations (T0 to T3 and T1 to T4) representing detection intervals of rises and falls detected in the pre-specified first number (T0, T1, T2 and T3 being four and T1, T2, T3 and T4 being four) prior to the current rise or fall detected in step 210. For each of the calculated total durations E1 and E2, control is performed in step 219 to memorize a pre-specified number (two in the present exemplary embodiment) of the total durations E1 and E2 in the NVM 76 as a history. The duration E is estimated on the basis of, of the pre-specified number of total durations E1 and E2 memorized in the NVM 76, the second number (two in the present exemplary embodiment) of total durations E1 and E2, and the angular speed W of the image forming drum 44 is calculated in step 240 by dividing the rotation angle $\theta_0$ by the estimated duration E.

—Fifth Exemplary Embodiment—

Next, a fifth exemplary embodiment will be described. Portions of the present exemplary embodiment that are the same as in the first exemplary embodiment, the second exemplary embodiment, the third exemplary embodiment and the fourth exemplary embodiment are assigned the same reference numerals and will not be described.

Figure 16:
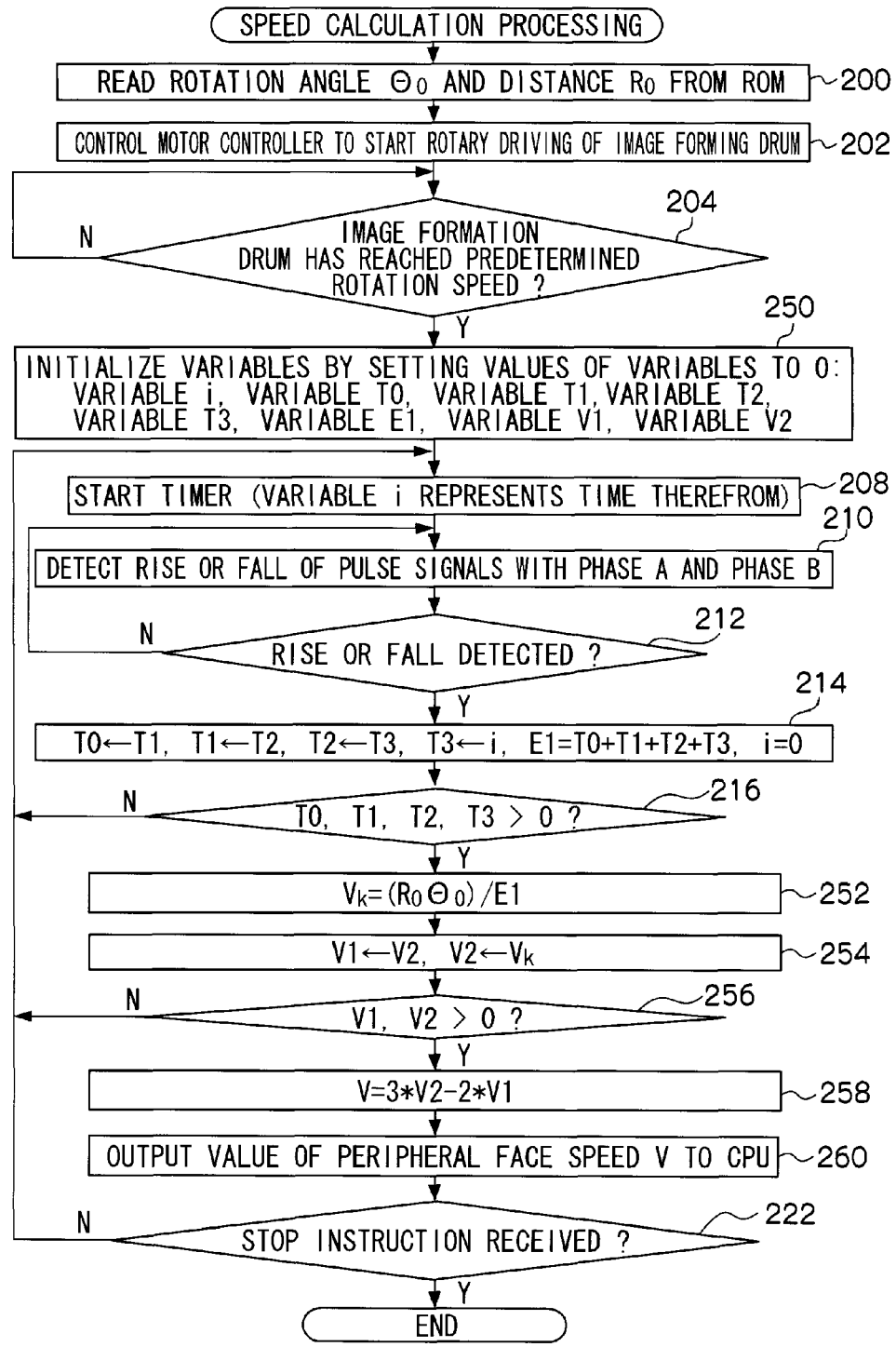
FIG. 16 is a flowchart of speed calculation processing that is executed by an FPGA of a fifth exemplary embodiment.

In the present exemplary embodiment, programs for executing the image formation control processing shown in FIG. 5 and the speed calculation processing shown in FIG. 16 are memorized in the ROM 72 in advance, the CPU 70 reads the program from the ROM 72 and executes the image formation control processing shown in FIG. 5, and the FPGA 79 reads the program from the ROM 72 and executes the speed calculation processing shown in FIG. 16.

Now the speed calculation processing that is executed by the FPGA 79 of the present exemplary embodiment will be described referring to FIG. 16.

Steps 200, 202 and 204 (steps 200 to 204) are the same as in the first exemplary embodiment, so will not be described. In the present exemplary embodiment, after step 204 the processing advances to step 250.

In step 250, variables—a variable i, a variable T0, a variable T1, a variable T2, a variable T3, a variable E1, a variable V1 and a variable V2—are initialized by setting values of the variables to zero. Then the processing advances to step 208. Hence, steps 208, 210, 212, 214 and 216 (steps 208 to 216) are the same as in the first exemplary embodiment, so will not be described. In the present exemplary embodiment, when the determination of step 216 is positive, the processing advances to step 252.

In step 252, a speed $V_k$ relating to rotation of the image forming drum 44 is detected on the basis of the total duration E1 and the rotation angle $\theta_0$ of the image forming drum 44 that corresponds to one pulse of the pulse signals. More specifically, in step 252, the peripheral face speed $V_k$ of the image forming drum 44 is detected by dividing the movement distance $(R_0\theta_0)$ of the peripheral face of the image forming drum 44 through the rotation angle $\theta_0$ by the total duration E1, as in the following equation (13).

$$V_k = (R_0\theta_0)/E1 \qquad \text{Equation (13)}$$

Herein, step 252 corresponds to a speed detection section of a speed calculation component.

Then, in step 254, the value of variable V1 is updated by putting the value of variable V2 into variable V1, and the value of variable V2 is updated by putting the value of variable $V_k$ into variable V2.

Next, in step 256, by judging whether or not all the values of variable V1 and variable V2 are greater than zero, it is determined whether or not information that will be required when calculating a speed in step 258, details of which are described below, is all present.

In step 256, if it is judged that there is a variable among all the variables of variable V1 and variable V2 whose value is zero, it is determined that not all the information that would be required when calculating the speed in step 258 whose details are described below is present, and the processing returns to step 208. On the other hand, if it is judged in step 256 that the values of all the variables of variable V1 and variable V2 are greater than zero, it is determined that all the information that will be required when calculating the speed in step 258 whose details are described below is present, and the processing advances to the next step 258.

In step 258, a speed relating to rotation of the image forming drum 44 that is to be detected subsequent to the speed relating to rotation of the image forming drum 44 that has been currently detected in step 252 is calculated by estimation, by linear extrapolation on the basis of the pre-specified second number (V1 and V2 being two in the present exemplary embodiment) of speeds relating to rotation of the image forming drum 44 (peripheral face speeds in the present exemplary embodiment), as in the following equation (14). More specifically, in step 258, a peripheral face speed V of the image forming drum 44 to be detected subsequent to the peripheral face speed $V_k$ of the image forming drum 44 that has been detected in step 252 at the current time is calculated by estimation, on the basis of the pre-specified second number of peripheral face speeds V1 and V2, as in the following equation (14).

$$V = 3*V2 - 2*V1 \qquad \text{Equation (14)}$$

In step 258, the peripheral face speed V may be estimated as in the following equation (15).

$$V = 4*V2 - 3*V1 \qquad \text{Equation (15)}$$

Herein, steps 254, 256 and 258 (steps 254 to 258) correspond to the speed detection section of the speed calculation component.

Then, in step 260, the value of the peripheral face speed V calculated in step 258 is outputted (reported) to the CPU 70. Then the processing advances to step 222.

The speed calculation device of the image forming device 10 of the present exemplary embodiment as described above, each time a rise or fall is detected in step 210, calculates, in step 214, the duration of the total E1 of the durations (T0 to T3 and T1 to T4) representing detection intervals of rises and falls that have been detected in the pre-specified first number (T0, T1, T2 and T3 being four and T1, T2, T3 and T4 being four) prior to the current rise or fall detected in step 210. A speed relating to rotation of the image forming drum 44 (the peripheral face speed in the present exemplary embodiment) is detected in step 252 on the basis of the calculated total duration E1 and the rotation angle $\theta_0$, and after the pre-specified number (V1 and V2 being two in the present exemplary embodiment) of speeds relating to rotation of the image forming drum 44 have been detected in step 252 (i.e., when the determination in step 256 is positive), a speed relating to rotation of the image forming drum 44 that will be detected in step 252 is calculated by estimation in step 258.

—Sixth Exemplary Embodiment—

Next, a sixth exemplary embodiment will be described. Portions of the present exemplary embodiment that are the same as in the first exemplary embodiment, the second exemplary embodiment, the third exemplary embodiment, the fourth exemplary embodiment and the fifth exemplary embodiment are assigned the same reference numerals and will not be described.

Figure 17:
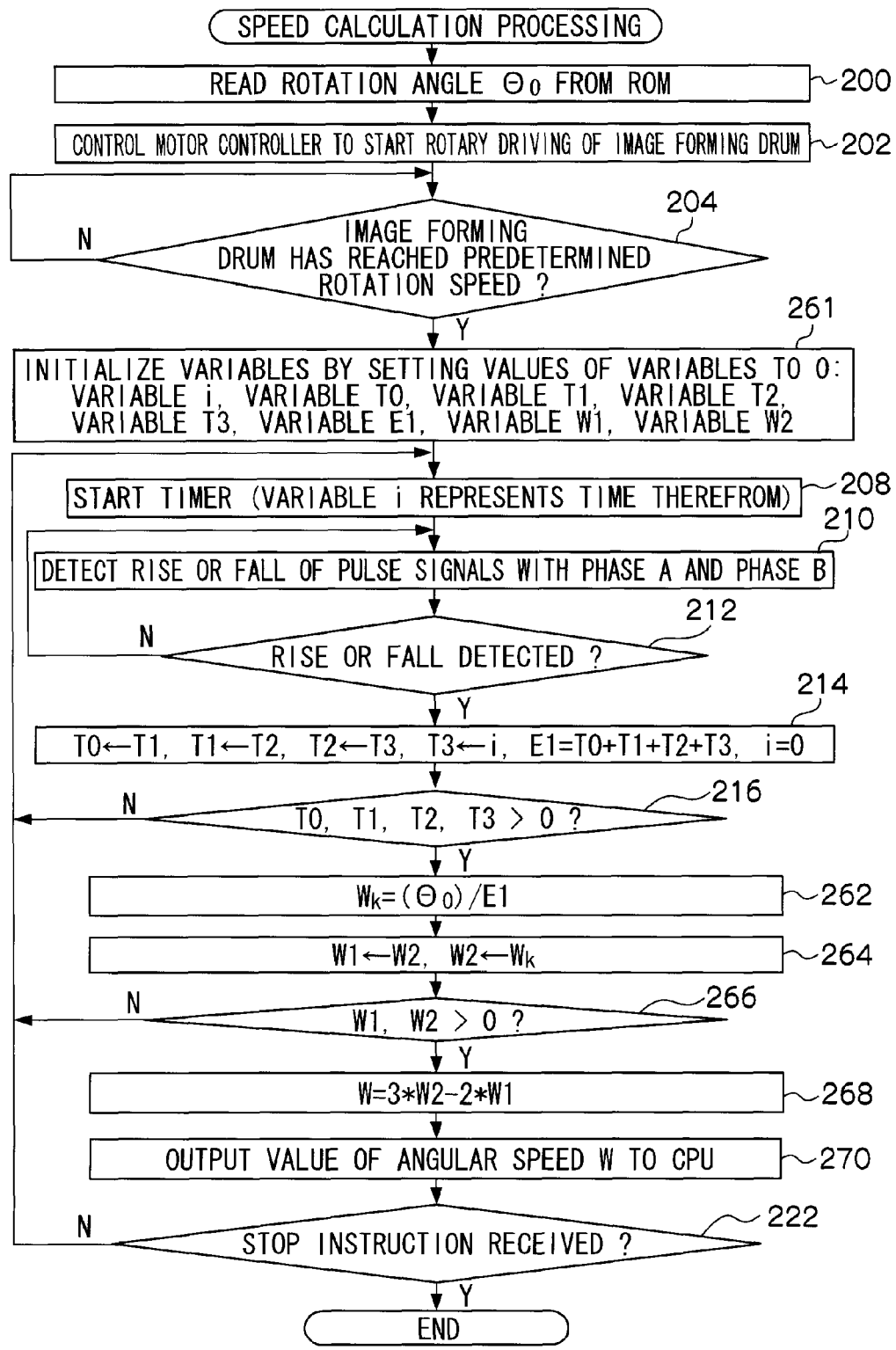
FIG. 17 is a flowchart of speed calculation processing that is executed by an FPGA of a sixth exemplary embodiment.

In the present exemplary embodiment, programs for executing the image formation control processing shown in FIG. 13 and the speed calculation processing shown in FIG. 17 are memorized in the ROM 72 in advance, the CPU 70 reads the program from the ROM 72 and executes the image formation control processing shown in FIG. 13, and the FPGA 79 reads the program from the ROM 72 and executes the speed calculation processing shown in FIG. 17.

Now the speed calculation processing that is executed by the FPGA 79 of the present exemplary embodiment will be described referring to FIG. 17.

Steps 201, 202 and 204 (steps 201 to 204) are the same as in the third exemplary embodiment, so will not be described. In the present exemplary embodiment, after step 204 the processing advances to step 261.

In step 261, variables—a variable i, a variable T0, a variable T1, a variable T2, a variable T3, a variable E1, a variable W1 and a variable W2—are initialized by setting values of the variables to zero. Then the processing advances to step 208. Hence, steps 208, 210, 212, 214 and 216 (steps 208 to 216) are the same as in the first exemplary embodiment (or the third exemplary embodiment), so will not be described. In the present exemplary embodiment, when the determination of step 216 is positive, the processing advances to step 262.

In step 262, a speed $W_k$ relating to rotation of the image forming drum 44 is detected on the basis of the total duration E1 and the rotation angle $\theta_0$ of the image forming drum 44 that corresponds to one pulse of the pulse signals. More specifically, in step 262, the speed $W_k$ of the rotation of the image forming drum 44 is detected by dividing the rotation angle $\theta_0$ by the total duration E1, as in the following equation (16).

$$W_k = \theta_0/E1 \qquad \text{Equation (16)}$$

Herein, step 262 corresponds to the speed detection section of the speed calculation component.

Then, in step 264, the value of variable W1 is updated by putting the value of variable W2 into variable W1, and the value of variable W2 is updated by putting the value of variable $W_k$ into variable W2.

Next, in step 266, by judging whether or not all the values of variable W1 and variable W2 are greater than zero, it is determined whether or not information that will be required when calculating a speed in step 268, details of which are described below, is all present.

In step 266, if it is judged that there is a variable among all the variables of variable W1 and variable W2 whose value is zero, it is determined that not all the information that would be required when calculating the speed in step 268 whose details are described below is present, and the processing returns to step 208. On the other hand, if it is judged in step 266 that the values of all the variables of variable W1 and variable W2 are greater than zero, it is determined that all the information that will be required when calculating the speed in step 268 whose details are described below is present, and the processing advances to the next step 268.

In step 268, a speed relating to rotation of the image forming drum 44 that is to be detected subsequent to the speed $W_k$ relating to rotation of the image forming drum 44 that has been currently detected in step 262 is calculated by estimation, by linear extrapolation on the basis of the pre-specified second number (W1 and W2 being two in the present exemplary embodiment) of speeds relating to rotation of the image forming drum 44 (angular speeds in the present exemplary embodiment), as in the following equation (17). More specifically, in step 268, an angular speed W of the image forming drum 44 to be detected subsequent to the angular speed $W_k$ that has been detected in step 262 at the current time is calculated by estimation, on the basis of the pre-specified second number of angular speeds W1 and W2, as in the following equation (17).

$$W = 3*W2 - 2*W1 \qquad \text{Equation (17)}$$

In step 268, the angular speed W may be estimated as in the following equation (18).

$$W = 4*W2 - 3*W1 \qquad \text{Equation (18)}$$

Steps 264, 266 and 268 (steps 264 to 268) correspond to the speed detection section of the speed calculation component.

Then, in step 270, the value of the angular speed W calculated in step 268 is outputted (reported) to the CPU 70. Then the processing advances to step 222.

The speed calculation device of the image forming device 10 of the present exemplary embodiment as described above, each time a rise or fall is detected in step 210, calculates, in step 214, the duration of the total E1 of the durations (T0 to T3 and T1 to T4) representing detection intervals of rises and falls that have been detected in the pre-specified first number (T0, T1, T2 and T3 being four and T1, T2, T3 and T4 being four) prior to the current rise or fall detected in step 210. A speed relating to rotation of the image forming drum 44 (the angular speed $W_k$ in the present exemplary embodiment) is detected in step 262 on the basis of the calculated total duration E1 and the rotation angle $\theta_0$, and after the pre-specified number (W1 and W2 being two in the present exemplary embodiment) of speeds relating to rotation of the image forming drum 44 have been detected in step 262 (i.e., when the determination in step 266 is positive), a speed relating to rotation of the image forming drum 44 that will be detected in step 262 is calculated by estimation in step 268.

Figure 18:
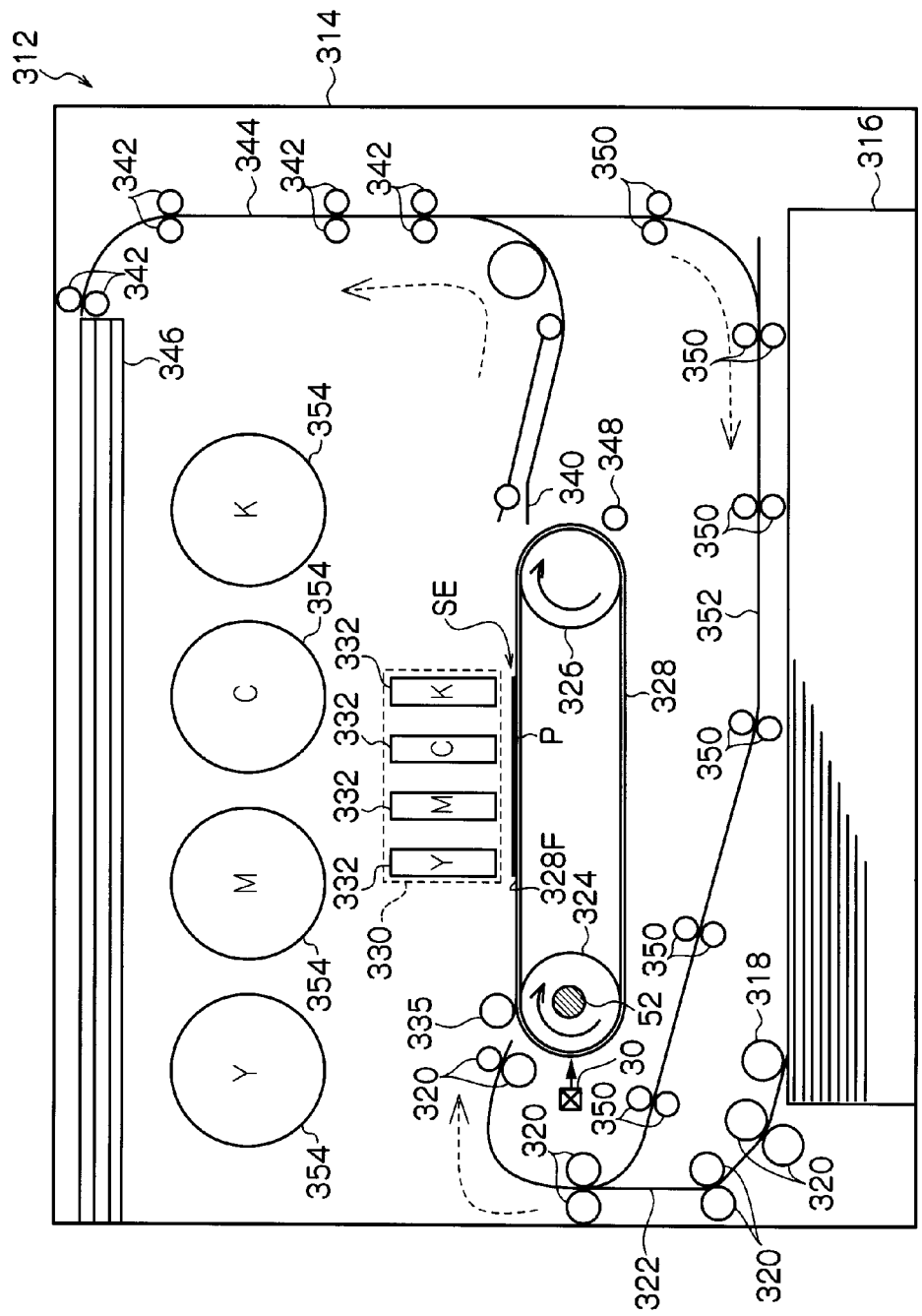
FIG. 18 is a diagram illustrating another structure, which is an example to which the present invention is applicable.

In the exemplary embodiments described above (the first exemplary embodiment, the second exemplary embodiment, the third exemplary embodiment, the fourth exemplary embodiment, the fifth exemplary embodiment and the sixth exemplary embodiment), examples are described in which the present invention is applied to calculating a speed (the peripheral face speed V or the angular speed W) relating to rotation of the image forming drum 44 which serves as the rotating body in the image forming device 10 with the structure illustrated in FIG. 1. However, the present invention is not to be limited thus. For example, the present invention may be applied when calculating speeds of rotating bodies. For example, the present invention may be applied to a case of detecting a conveyance speed of a conveyance belt 328, by calculating a speed (a peripheral face speed or an angular speed) of a driving roller 324 which serves as a rotating body in an image forming device 312 as illustrated in FIG. 18, and altering a period P of a clock signal in accordance with the conveyance speed, or the like.

Now, general structure of the image forming device 312 illustrated in FIG. 18 will be described. As is shown in FIG. 18, a paper supply tray 316 is provided at a lower portion of the interior of a casing 314 of the image forming device 312, and recording paper W that is stacked in the paper supply tray 316 may be taken out one sheet at a time by a pickup roller 318. The recording paper W that is taken out is conveyed by plural conveyance roller pairs 320 which constitute a predetermined conveyance path 322. Hereinbelow, where simply "the conveyance direction" is referred to, this means a conveyance direction of the recording paper W, and where "upstream" and "downstream" are referred to, these mean upstream and downstream, respectively, in the conveyance direction.

The conveyance belt 328 is provided above the paper supply tray 316 in an endless form spanning between the driving roller 324 and a driven roller 326. The driving roller 324 receives driving force from the motor 30 and rotates. The driving roller 324 is equipped with the rotary encoder 52.

A recording head array 330 is disposed above the conveyance belt 328, opposing a flat portion 328F of the conveyance belt 328. This opposing region is an ejection region SE at which ink drops are ejected from the recording head array 330. The recording paper W that has been conveyed along the conveyance path 322 is retained at the conveyance belt 328 and reaches the ejection region SE, and in a state in which the recording paper W opposes the recording head array 330, ink droplets from the recording head array 330 are applied thereto in accordance with image information.

Then, by the recording paper W being conveyed in the state of being retained at the conveyance belt 328, the recording paper W passes through the interior of the ejection region SE and image formation may be performed. The recording paper W may be passed through the interior of the ejection region SE a plural number of times by being circulated in the state in which the recording paper W is retained at the conveyance belt 328. Thus, image formation with "multipassing" may be performed.

At the recording head array 330, four inkjet recording heads 332, corresponding to four respective colors Y, M, C and K, are arranged along the conveyance direction, effective recording regions thereof having long strip forms of at least the width of the recording paper W (i.e., the length in a direction orthogonal to the conveyance direction). Thus, full-color images may be formed. The inkjet recording heads 332 have the same constitution as the inkjet recording heads 48 described in the first exemplary embodiment, and similarly to the inkjet recording heads 48, include the nozzles 48a. Operations of the inkjet recording heads 332 are controlled by the recording head controller 84 described in the first exemplary embodiment.

A charging roller 335, to which a power supply is connected, is disposed at the upstream side of the recording head array 330. The charging roller 335 nips and is driven by the conveyance belt 328 and the recording paper W between the charging roller 335 and the driving roller 324, and is formed to be movable between a pressing position, which presses the recording paper W against the conveyance belt 328, and a withdrawn position, which is withdrawn from the conveyance belt 328. When at the pressing position, the charging roller 335 provides electronic charge to the recording paper W and causes the recording paper W to be electrostatically adhered to the conveyance belt 328.

A separation plate 340, which is formed with an aluminium plate or the like, is disposed at the downstream side of the recording head array 330. The separation plate 340 is capable of separating the recording paper W from the conveyance belt 328. The separated recording paper W is conveyed by plural ejection roller pairs 342, which constitute an ejection path 344 at the downstream side of the separation plate 340, and is ejected to an ejection tray 346 disposed at an upper portion of the casing 314.

A cleaning roller 348, which is capable of nipping the conveyance belt 328 against the driven roller 326, is disposed below the separation plate 340. The surface of the conveyance belt 328 is cleaned by the cleaning roller 348.

An inversion path 352, which is constituted by plural inversion roller pairs 350, is provided between the paper supply tray 316 and the conveyance belt 328. The inversion path 352 inverts recording paper W at one face of which image formation has been performed, and causes the recording paper W to be retained at the conveyance belt 328. Thus, image formation on both faces of the recording paper W is implemented with ease.

Ink tanks 354, which respectively store inks of the four colors, are disposed between the conveyance belt 328 and the ejection tray 346. The inks in the ink tanks 354 are supplied to the recording head array 330 by ink supply piping. Thus, structure of the image forming device 312 has been described with reference to FIG. 18.

Figure 19:
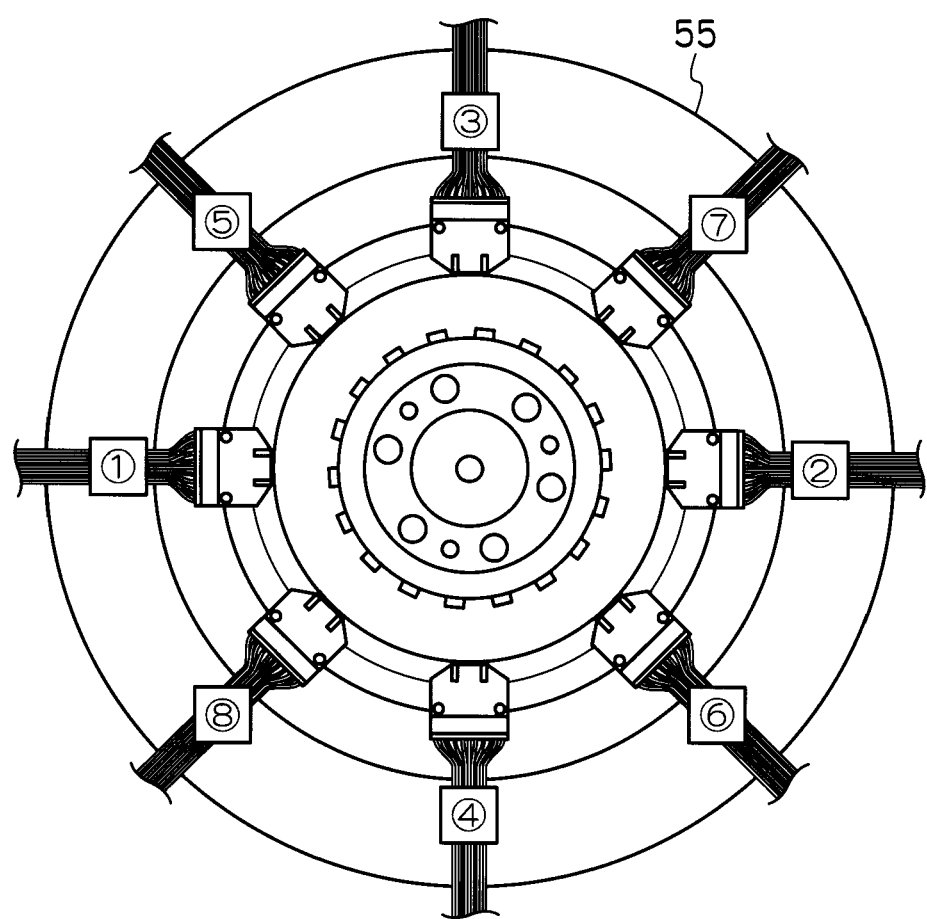
FIG. 19 is a diagram for describing a variant example of an encoder.

Furthermore, in the exemplary embodiments described above, examples have been described which employ the rotary encoder 52 that generates two pulse signals with phase A and phase B. However, an encoder may be employed that generates more numerous pulse signals in order to improve the measurement frequency. For example, an encoder 55 illustrated in FIG. 19 may be employed, which is equipped with eight detectors around a code wheel. If this encoder 55 is employed, tracking of variations in speed is further improved and clock signals for printing (image formation) are generated with higher accuracy.

Further, in the exemplary embodiments described above, the inkjet recording heads 48 or 332 are constituted with the plural nozzles 48a being lined up in two rows with respect to the sub-scanning direction. However, the present invention is not to be limited thus. The constitutions of the inkjet recording heads 48 or 332 may be any constitution as long as the plural nozzles 48a are two-dimensionally arranged without overlapping in the sub-scanning direction.

Further, the exemplary embodiments described above have been described giving examples of image forming devices of modes which form images directly on recording paper W with the inkjet recording heads. However, the present invention is not to be limited thus. Image forming devices of modes that form images on recording paper W via intermediate transfer bodies are also possible. Such cases may be exemplified by an image forming device of a mode in which a latent image is formed on a peripheral face (a predetermined face) of a photosensitive drum, which is a rotating body, by recording heads that are provided with light-emitting elements such as LEDs or the like, the latent image is converted to a toner image, and the toner image is transferred onto a surface of a recording paper.

In addition, the structures of the image forming devices 10 and 312 described in the above exemplary embodiments are examples, and may be modified in accordance with circumstances within a technical scope not departing from the spirit of the present invention.

Further, the mathematical formulae described in the above exemplary embodiments are examples. Unnecessary parameters may be removed and new parameters may be added.

Further, the various processing programs described in the above exemplary embodiments are examples. Within a technical scope not departing from the spirit of the present invention, unnecessary steps may be removed, new steps may be added, and processing sequences may be rearranged.

What is claimed is:

1. A speed calculation device for a printing apparatus including inkjet recording heads each having a plurality of image forming elements, the device comprising:
   a rotary encoder that generates a plurality of pulse signals with different phases in accordance with rotation of an image forming drum of the printing apparatus;
   a programmable detection component that detects rises and falls of respective pulses of the plurality of pulse signals generated by the rotary encoder;
   the programmable detection component including a duration calculation component that, each time a rise or fall is detected by the detection component, calculates a total duration of a pre-specified number of durations representing detection intervals of rises or falls detected by the detection component prior to the current rise or fall detected by the detection component; and
   the programmable detection component including a speed calculation component that calculates a speed relating to rotation of the image forming drum on the basis of the total duration and a rotation angle of the image forming drum that corresponds to one pulse of the pulse signals, to output a clock signal whereby the image forming elements form dots that respectively constitute an image at a predetermined surface synchronously with the clock signal to suppress deformation of the image due to variations in speed relating to rotation of the image forming drum.

2. The speed calculation device of claim 1, wherein the speed calculation component divides the rotation angle of the image forming drum that corresponds to one pulse of the pulse signals by the total duration and calculates an angular speed of the image forming drum.

3. The speed calculation device of claim 1, wherein the speed calculation component divides a movement distance of a peripheral face of the image forming drum through the rotation angle of the image forming drum that corresponds to one pulse of the pulse signals by the total duration and calculates a peripheral face speed of the image forming drum.

4. A speed calculation device for a printing apparatus including inkjet recording heads each having a plurality of image forming elements, the device comprising:
   a rotary encoder that generates a plurality of pulse signals with different phases in accordance with rotation of an image forming drum of the printing apparatus;
   a programmable detection component that detects rises and falls of respective pulses of the plurality of pulse signals generated by the rotary encoder;
   the programmable detection component including a duration calculation component that, each time a rise or fall is detected by the detection component, calculates a total duration of a pre-specified first number of durations representing detection intervals of rises or falls detected by the detection component prior to the current rise or fall detected by the detection component; and
   the programmable detection component including a speed calculation component that calculates a speed relating to rotation of the image forming drum on the basis of a pre-specified second number of the total durations calculated by the duration calculation component and a rotation angle of the image forming drum that corresponds to one pulse of the pulse signals, to output a clock signal whereby the image forming elements form dots that respectively constitute an image at a predetermined surface synchronously with the clock signal to suppress deformation of the image due to variations in speed relating to rotation of the image forming drum.

5. The speed calculation device of claim 4, further comprising
   a memory control component that controls such that, each time the total duration is calculated by the duration calculation component, a pre-specified third number of the total durations are memorized in a memory component as a history,
   wherein the speed calculation component estimates a duration that would be used in calculating the speed relating to rotation of the image forming drum a next time, on the basis of, of the pre-specified third number of total durations memorized in the memory component, the second number of total durations, and calculates the speed relating to rotation of the image forming drum on the basis of the estimated duration and the rotation angle of the image forming drum that corresponds to one pulse of the pulse signals.

6. The speed calculation device of claim 4, wherein the speed calculation component estimates a duration that would be used in calculating the speed relating to rotation of the image forming drum a next time on the basis of the second number of total durations, and divides the rotation angle of the image forming drum that corresponds to one pulse of the pulse signals by the estimated duration and calculates an angular speed of the image forming drum.

7. The speed calculation device of claim 4, wherein the speed calculation component estimates a duration that would be used in calculating the speed relating to rotation of the image forming drum a next time on the basis of the second number of total durations, and divides a movement distance of a peripheral face of the image forming drum through the rotation angle of the image forming drum that corresponds to one pulse of the pulse signals by the estimated duration and calculates a peripheral face speed of the image forming drum.

8. The speed calculation device of claim 4, wherein the second number of total durations is two total durations, being the total duration calculated by the duration calculation component at the current time and the total duration calculated by the duration calculation component at a previous time.

9. A speed calculation device for a printing apparatus including inkjet recording heads each having a plurality of image forming elements, the device comprising:
   a rotary encoder that generates a plurality of pulse signals with different phases in accordance with rotation of an image forming drum of the printing apparatus;
   a programmable detection component that detects rises and falls of respective pulses of the plurality of pulse signals generated by the rotary encoder;
   the programmable detection component including a duration calculation component that, each time a rise or fall is detected by the detection component, calculates a total duration of a pre-specified first number of durations representing detection intervals of rises or falls detected by the detection component prior to the current rise or fall detected by the detection component; and
   the programmable detection component including a speed calculation component that includes
      a speed detection section that detects a speed relating to rotation of the image forming drum on the basis of the total duration and a rotation angle of the rotating image forming drum that corresponds to one pulse of the pulse signals, and
      a speed calculation section that, after a pre-specified number of speeds have been detected by the speed detection section, calculates by estimation, on the basis of a pre-specified second number of the speeds relating to rotation of the image forming drum that have been detected by the speed detection section, the speed relating to rotation of the image forming drum that is to be detected subsequent to the speed relating to rotation of the image forming drum currently detected by the speed detection section, to output a clock signal whereby the image forming elements form dots that respectively constitute an image at a predetermined surface synchronously with the clock signal to suppress deformation of the image due to variations in speed relating to rotation of the image forming drum.

10. The speed calculation device of claim 9, wherein
   the speed detection section divides the rotation angle of the image forming drum that corresponds to one pulse of the pulse signals by the total duration and detects an angular speed of the image forming drum, and
   the speed calculation section, after the pre-specified number of angular speeds have been detected by the speed detection section, calculates by estimation, on the basis of the pre-specified second number of angular speeds that have been detected by the speed detection section, the angular speed of the image forming drum that is to be detected subsequent to the angular speed currently detected by the speed detection section.

11. The speed calculation device of claim 9, wherein
the speed detection section divides a movement distance of a peripheral face of the image forming drum through the rotation angle of the image forming drum that corresponds to one pulse of the pulse signals by the total duration and detects a peripheral face speed of the image forming drum, and
the speed calculation section, after the pre-specified number of peripheral face speeds have been detected by the speed detection section, calculates by estimation, on the basis of the pre-specified second number of peripheral face speeds that have been detected by the speed detection section, the peripheral face speed of the image forming drum that is to be detected subsequent to the peripheral face speed currently detected by the speed detection section.

12. An image forming device comprising:
the speed calculation device of any one of claim 2, claim 6 or claim 10;
a period calculation component that calculates a period of the clock signal on the basis of
the angular speed calculated by the speed calculation device,
a distance between an axis of the rotating body and a peripheral face of the image forming drum, and
a distance between neighboring dots;
wherein the image forming drum of the rotation speed detection device rotates with the peripheral face opposing the plurality of image forming elements in a state in which a recording medium is retained at the peripheral face, such that the image is formed at the recording medium by the plurality of image forming elements.

13. The image forming device of claim 12, wherein the plurality of image forming elements of each recording head are arranged two-dimensionally without overlapping in a sub-scanning direction.

14. An image forming device comprising:
the speed calculation device of any one of claim 3, claim 7 or claim 11;
a period calculation component that calculates a period of the clock signal on the basis of the peripheral face speed calculated by the speed calculation device and a distance between neighboring dots;
wherein the image forming drum of the rotation speed detection device rotates with the peripheral face opposing the plurality of image forming elements in a state in which a recording medium is retained at the peripheral face, such that the image is formed at the recording medium by the plurality of image forming elements.

15. The image forming device of claim 14, wherein the plurality of image forming elements of each recording head are arranged two-dimensionally without overlapping in a sub-scanning direction.

16. A storage medium readable by a computer, the storage medium storing a program of instructions executable by the computer to function as:
a detection component that detects rises and falls of respective pulses of a plurality of pulse signals generated by a rotary encoder of a printing apparatus including inkjet recording heads each having a plurality of image forming elements, the rotary encoder generating the plurality of pulse signals with different phases in accordance with rotation of an image forming drum of the printing apparatus;
a duration calculation component that, each time a rise or fall is detected by the detection component, calculates a total duration of a pre-specified number of durations representing detection intervals of rises or falls detected by the detection component prior to the current rise or fall detected by the detection component; and
a speed calculation component that calculates a speed relating to rotation of the image forming drum on the basis of the total duration and a rotation angle of the image forming drum that corresponds to one pulse of the pulse signals, to output a clock signal whereby the image forming elements form dots that respectively constitute an image at a predetermined surface synchronously with the clock signal to suppress deformation of the image due to variations in speed relating to rotation of the image forming drum.

17. A storage medium readable by a computer, the storage medium storing a program of instructions executable by the computer to function as:
a detection component that detects rises and falls of respective pulses of a plurality of pulse signals generated by a rotary encoder of a printing apparatus including inkjet recording heads each having a plurality of image forming elements, the rotary encoder generating the plurality of pulse signals with different phases in accordance with rotation of an image forming drum of the printing apparatus;
a duration calculation component that, each time a rise or fall is detected by the detection component, calculates a total duration of a pre-specified first number of durations representing detection intervals of rises or falls detected by the detection component prior to the current rise or fall detected by the detection component; and
a speed calculation component that calculates a speed relating to rotation of the image forming drum on the basis of a pre-specified second number of the total durations calculated by the duration calculation component and a rotation angle of the image forming drum that corresponds to one pulse of the pulse signals, to output a clock signal whereby the image forming elements form dots that respectively constitute an image at a predetermined surface synchronously with the clock signal to suppress deformation of the image due to variations in speed relating to rotation of the image forming drum.

18. A storage medium readable by a computer, the storage medium storing a program of instructions executable by the computer to function as:
a detection component that detects rises and falls of respective pulses of a plurality of pulse signals generated by a rotary encoder of a printing apparatus including inkjet recording heads each having a plurality of image forming elements, the rotary encoder generating the plurality of pulse signals with different phases in accordance with rotation of an image forming drum of the printing apparatus;
a duration calculation component that, each time a rise or fall is detected by the detection component, calculates a total duration of a pre-specified first number of durations representing detection intervals of rises or falls detected by the detection component prior to the current rise or fall detected by the detection component; and
a speed calculation component that includes
a speed detection section that detects a speed relating to rotation of the image forming drum on the basis of the total duration and a rotation angle of the image forming drum that corresponds to one pulse of the pulse signals, and a speed calculation section that, after a pre-specified number of speeds have been detected by the speed detection section, calculates by estimation, on the basis of a pre-specified second number of the speeds relating to rotation of the image forming drum that have been detected by the speed detection section, the speed relating to rotation of the image forming drum that is to be detected subsequent to the speed relating to rotation of the image forming drum currently detected by the speed detection section, to output a clock signal whereby the image forming elements form dots that respectively constitute an image at a predetermined surface synchronously with the clock signal to suppress deformation of the image due to variations in speed relating to rotation of the image forming drum.

* * * * *